US012223365B2

(12) United States Patent
Casey et al.

(10) Patent No.: US 12,223,365 B2
(45) Date of Patent: *Feb. 11, 2025

(54) PREDICTIVE RESOURCE ALLOCATION IN AN EDGE COMPUTING NETWORK UTILIZING MACHINE LEARNING

(71) Applicant: CenturyLink Intellectual Property LLC, Broomfield, CO (US)

(72) Inventors: Steven M. Casey, Littleton, CO (US); Felipe Castro, Erie, CO (US); Stephen Opferman, Denver, CO (US); Kevin M. McBride, Littleton, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,701

(22) Filed: Nov. 24, 2023

(65) Prior Publication Data

US 2024/0086252 A1   Mar. 14, 2024

Related U.S. Application Data

(63) Continuation of application No. 17/090,387, filed on Nov. 5, 2020, now Pat. No. 11,829,800.
(Continued)

(51) Int. Cl.
*G06F 9/50* (2006.01)
*G06F 11/34* (2006.01)
(Continued)

(52) U.S. Cl.
CPC ............ *G06F 9/5072* (2013.01); *G06F 9/505* (2013.01); *G06F 9/5077* (2013.01);
(Continued)

(58) Field of Classification Search
None
See application file for complete search history.

(56) References Cited

U.S. PATENT DOCUMENTS 9,832,606 B1    11/2017  Jones, II et al.
11,418,578 B1*  8/2022   Pandey ................. G06N 20/00
(Continued)

FOREIGN PATENT DOCUMENTS

EP    3457664 A1    3/2019

OTHER PUBLICATIONS

Canadian Examination Report, dated Jun. 29, 2023, Application No. 3157413, filed Nov. 5, 2020; 2 pgs.
(Continued)

*Primary Examiner* — Jeffrey R Swearingen

(57) ABSTRACT

The present technology relates to improving computing services in a distributed network of remote computing resources, such as edge nodes in an edge compute network. In an aspect, the technology relates to a method that includes aggregating historical request data for a plurality of requests, wherein the aggregated historical request data a time of the request, a location of a device from which the request originated, and/or a type of service being requested. The method also incudes training a machine learning model based on the aggregated historical request data; generating, from the trained machine learning model, a prediction for a type of service to be request; identifying an edge node, from a plurality of edge nodes, based on a physical location of the edge node; and based on predicted service, allocating computing resources for the computing service on the identified edge node.

14 Claims, 15 Drawing Sheets

Related U.S. Application Data

(60) Provisional application No. 62/931,538, filed on Nov. 6, 2019.

(51) Int. Cl.

| | | |
|---|---|---|
| *G06N 20/00* | (2019.01) | |
| *H04L 43/0882* | (2022.01) | |
| *H04L 43/12* | (2022.01) | |
| *H04L 43/16* | (2022.01) | |
| *H04L 47/83* | (2022.01) | |
| *H04L 61/50* | (2022.01) | |
| *H04L 67/10* | (2022.01) | |
| *H04L 67/1008* | (2022.01) | |
| *H04L 67/1021* | (2022.01) | |
| *H04L 67/146* | (2022.01) | |
| *H04L 67/63* | (2022.01) | |
| *H04L 101/622* | (2022.01) | |

(52) U.S. Cl.
CPC ......... *G06F 11/3409* (2013.01); *G06N 20/00* (2019.01); *H04L 43/0882* (2013.01); *H04L 43/12* (2013.01); *H04L 43/16* (2013.01); *H04L 47/83* (2022.05); *H04L 61/50* (2022.05); *H04L 67/10* (2013.01); *H04L 67/1008* (2013.01); *H04L 67/1021* (2013.01); *H04L 67/146* (2013.01); *H04L 67/63* (2022.05); *G06F 2209/5019* (2013.01); *H04L 2101/622* (2022.05)

(56) References Cited

U.S. PATENT DOCUMENTS

| | | | |
|---|---|---|---|
| 2019/0109926 A1* | 4/2019 | Hotchkies | H04L 67/01 |
| 2019/0158606 A1 | 5/2019 | Bernat et al. | |
| 2021/0011766 A1 | 1/2021 | Kumar | |
| 2021/0136006 A1 | 5/2021 | Casey | |
| 2021/0194988 A1* | 6/2021 | Chaysinh | H04L 41/5025 |
| 2023/0041568 A1* | 2/2023 | Pan | H04W 28/0236 |

OTHER PUBLICATIONS

European Examination Report, dated Mar. 20, 2023, Application No. 20817121.5, filed Nov. 5, 2020; 8 pgs.

International Search Report and Written Opinion of the International Searching Authority, dated Apr. 12, 2021, Int'l Appl. No. PCT/US20/059162, Int'l Filing Date Nov. 5, 2020; 29 pgs.

Invitation to Pay Additional Fees, dated Feb. 18, 2021, Int'l Appl. No. PCT/US20/059162, Int'l Filing Date Nov. 5, 2020; 25 pgs.

Han, Shuangfeng et al., "Big Data Enabled Mobile Network Design for 5G and Beyond", *IEEE Communications Magazine* vol. 55, No. 9; XP011660083 2017, pp. 150-157.

Canadian Examination Report, dated Jun. 12, 2024, Application No. 3,157,413, filed Nov. 5, 2020; 2 pgs.

\* cited by examiner

PREDICTIVE RESOURCE ALLOCATION IN AN EDGE COMPUTING NETWORK UTILIZING MACHINE LEARNING

CROSS-REFERENCE TO RELATED APPLICATION

Background

Users of computing devices commonly rely on resources remote from the computing device itself to perform operations and tasks. The remote resources are sometimes referred to as cloud-based resources. For example, video streaming services often rely on the delivery of video content to a user's computing device rather than having the video content stored locally on the user's computing device. Other examples include storage of information or remote processing of information, such as for tasks that require more processing power than is readily available on a standard consumer computing device. The remote resources that are accessed, however, may be physically located in disparate locations. In some cases, the physical location of the remote resource is a significant distance from the consumer. Thus, due to the increased distance, latency for communications between the computing device and the remote resource increases.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

The present technology relates to improving computing services in a distributed network of remote computing resources, such as edge nodes in an edge compute network. In an aspect, the technology relates to a computer-implemented method for reducing latency in providing computing services. The method includes receiving, from a mobile computing device, first location data for the mobile computing device at a first time; receiving, from the mobile computing device, second location data for the mobile computing device at a second time; and based on the first location data and the second location data, determining a direction vector for the mobile computing device. The method also includes based on the direction vector: identifying an edge node from a plurality of edge nodes corresponding to a predicted location of the mobile computing device; and prior to the mobile computing device being in the predicted location, allocating computing resources for the computing service on the identified edge node.

In another aspect, the technology relates to a computer-implemented method for reducing latency in providing computing services. The method includes receiving, from a mobile computing device, first location data for the mobile computing device at a first time; based on the first location data, identifying a first edge node from a plurality of edge nodes; receiving, from the mobile computing device, a request to perform a computing service; and performing, by the first edge node, at least a portion of the requested computing service. The method further includes receiving, from the mobile computing device, second location data for the mobile computing device at a second time; and based on the first location data and the second location data, determining a direction vector for the mobile computing device. The method also includes based on the direction vector: identifying a second edge node from a plurality of edge nodes corresponding to a predicted location of the mobile computing device; and allocating computing resources for the computing service on the second edge node so that the second edge node may continue performing the computing service.

In another aspect, the technology relates to a system for reducing latency in providing computing services. The system includes at least one processor; and memory storing instructions that, when executed by the at least one processor, causes the system to perform a plurality of operations. The operations include receiving, from a mobile computing device, first location data for the mobile computing device at a first time; based on the first location data, identifying a first edge node from a plurality of edge nodes; receiving, from the mobile computing device, a request to perform a computing service; performing, by the first edge node, at least a portion of the requested computing service; receiving, from the mobile computing device, second location data for the mobile computing device at a second time; and based on the first location data and the second location data, determining a direction vector for the mobile computing device. The operations further include, based on the direction vector: identifying a second edge node from a plurality of edge nodes corresponding to a predicted location of the mobile computing device; and allocating computing resources for the computing service on the second edge node so that the second edge node may continue performing the computing service.

In another aspect, the technology relates to a computer-implemented method for reducing latency in providing computing services. The method includes aggregating historical request data for a plurality of requests, wherein the aggregated historical request data includes at least the following data for a plurality of requests: a time of the request, a location of a device from which the request originated, and a type of service being requested; training a machine learning model based on the aggregated historical request data; and generating, from the trained machine learning model, a prediction for a type of service to be requested at a predicted time and a predicted location. The method further includes, based on the generated predicted location, identifying an edge node, from a plurality of edge nodes, based on a physical location of the edge node; and based on the generated predicted type of service and the predicted time, allocating computing resources for the computing service on the identified edge node.

In another aspect, the technology relates to a system for reducing latency in providing computing services. The system includes a plurality of edge nodes having different physical locations; a database storing historical request data for a plurality of requests; at least one processor; and memory, operatively connected to the at least one processor and storing instructions that, when executed by the at least one processor, cause the at least one processor to perform a set of operations. The operation include training a machine learning model based on the historical request data; generating, from the trained machine learning model, a prediction for a type of service to be requested at a predicted time and a predicted location; based on the generated predicted location, identifying an edge node, from a plurality of edge nodes, based on a physical location of the edge node; and based on the generated predicted type of service and the predicted time, allocating computing resources for the computing service on the identified edge node prior to the predicted time.

In another aspect, the technology relates to a computer-implemented method for reducing latency in providing computing services. The method include receiving, from a plurality of computing devices, a plurality of real-time requests for services to be performed by one or more edge nodes of a plurality of edge nodes; providing data representative of the plurality of real-time requests as an input into a trained machine learning model, wherein the trained machine learning model has been trained on historical request data; generating, based on an output of the trained machine learning model, a prediction for a type of service to be requested at a predicted time and a predicted location; based on the generated predicted location, identifying an edge node, from the plurality of edge nodes, based on a physical location of the identified edge node; and based on the generated predicted type of service and the predicted time, allocating computing resources for the computing service on the identified edge node prior to the predicted time.

In another aspect, the technology relates to a computer-implemented method for allocating hardware resources within a network. The method includes aggregating historical request data for a plurality of requests for services to be performed by one or more edge nodes; training a machine learning model based on the aggregated historical request data; generating, from the trained machine learning model, a prediction for an amount of requests for services at the one or more edge nodes; generating a predicted capacity needed to perform the predicted amount of requests; comparing the predicted capacity to a current capacity for the one or mode edge nodes; and based on the comparison, generating a recommendation for an alteration of hardware resources at the one or more edge nodes.

In another aspect, the technology relates to a system for allocating hardware resources within a network. The system includes a plurality of edge nodes having different physical locations; a database storing historical request data for a plurality of requests; at least one processor; and memory, operatively connected to the at least one processor and storing instructions that, when executed by the at least one processor, cause the at least one processor to perform a set of operations. The set of operations include aggregating historical request data for a plurality of requests for services to be performed by one or more edge nodes in the plurality of edge nodes; training a machine learning model based on the aggregated historical request data; generating, from the trained machine learning model, a prediction for an amount of requests for services at the one or more edge nodes; generating a predicted capacity needed to perform the predicted amount of requests; comparing the predicted capacity to a current capacity for the one or mode edge nodes; and based on the comparison, generating a recommendation for an alteration of hardware resources at the one or more edge nodes.

In another aspect, the technology relates to a computer-implemented method for allocating hardware resources within a network. The method includes aggregating historical request data for a plurality of requests for services to be performed by one or more edge nodes, wherein the aggregated historical request data includes performance data for the plurality of requests; training a machine learning model based on the aggregated historical request data; generating, by the machine learning model, a prediction for performance data for future requests; comparing the prediction for the performance data to a predetermined performance threshold; and based on the comparison, generating a recommendation for an alteration of hardware resources at the one or more edge nodes.

In another aspect, the technology relates to a system for allocating hardware resources in a network. The system includes a plurality of edge nodes having different physical locations; a beacon having a different physical location than the plurality of edge nodes; at least one processor; and memory, operatively connected to the at least one processor and storing instructions that, when executed by the at least one processor, cause the at least one processor to perform a set of operations. The operations include collecting traffic data from the beacon over a period of time, wherein the traffic data includes at least an amount of devices sending probe requests to the beacon; comparing that the amount of devices to a predetermined threshold for traffic data; and based on the comparison of the amount of devices to the predetermined threshold for traffic data, generating a recommendation for installation of a new edge node in addition to the plurality of edge nodes.

In another aspect, the technology relates to a computer-implemented method for allocating hardware resources in a network. The method includes collecting traffic data from a beacon over a period of time, wherein the traffic data includes at least an amount of devices sending probe requests to the beacon; comparing that the amount of devices to a predetermined threshold for traffic data; and based on the comparison of the amount of devices to the predetermined threshold for traffic data, generating a recommendation for installation of a new edge node in addition to a plurality of existing edge nodes.

In another aspect, the technology relates to a computer-implemented method for allocating hardware resources in a network. The method includes receiving, at a beacon at a first physical location, a plurality of requests for services to be performed by an edge node in an edge compute network; extracting a number of requests and a service types requested for the plurality of requests; forwarding the plurality of requests to the edge node for performance of the requested services; comparing that the number of requests to a predetermined traffic threshold; based on the comparison of the number of requests to the predetermined traffic threshold, generating a recommendation for installation of a new edge node in addition to the existing edge node; and based on the extracted service types, generating a recommendation for a hardware allocation for the new edge node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1A:
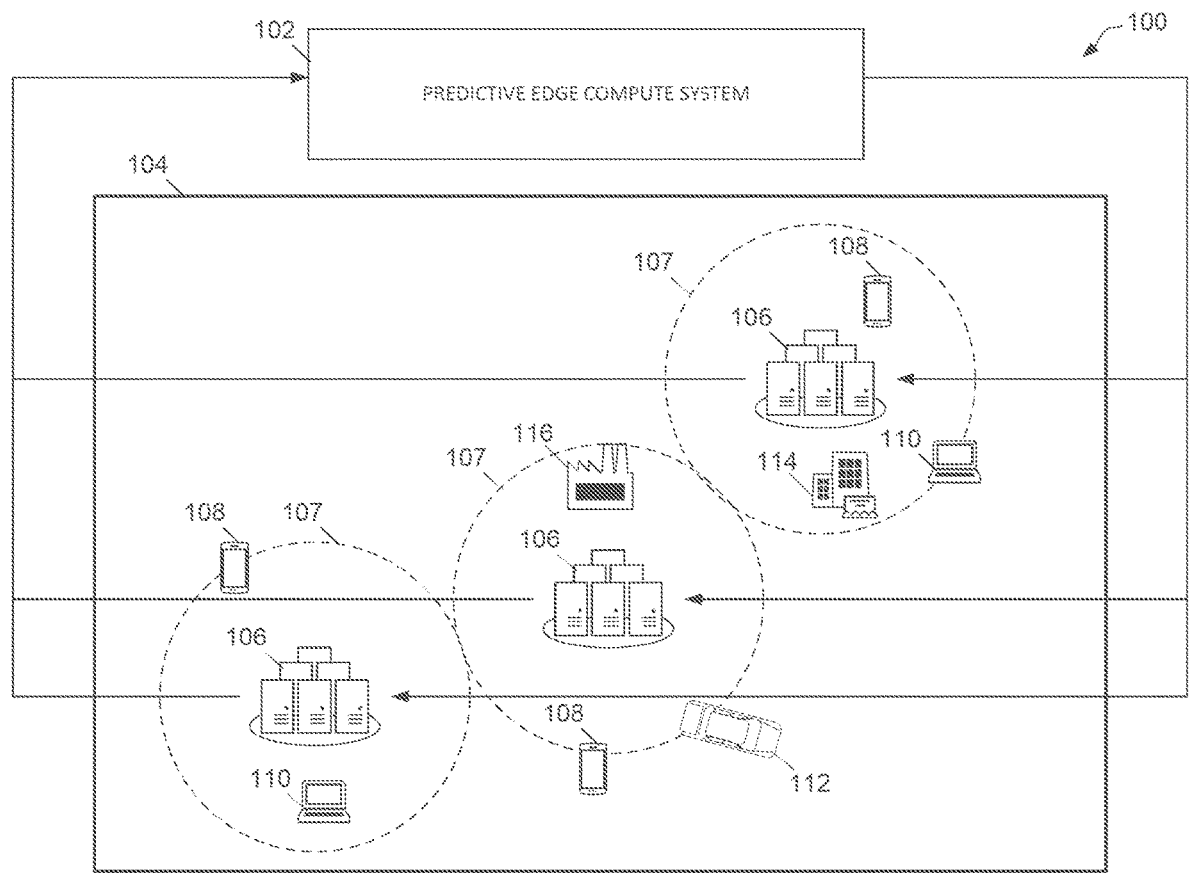
FIG. 1A depicts an example environment for which the present technology may be implemented.

As discussed above, remote computing resources or computing services are often utilized to process data or accomplish tasks. When a local device, such a mobile device of a user, sends a request to a remote computing resource, such as an edge node in an edge compute network, for a service to be performed or data to processed, the request must first travel from the local device through the network to the edge node. The edge node then processes the request by performing the requested service. A response to the request based on the performed service is then sent from the edge node back to the local device. Each of these operations takes time. Increasing the distance between the local device and the remote resource increases the amount of time, or latency, between a request being sent and a response being received. Further, if the remote resource is not properly prepared to handle the request, the amount of time taken to process the request also increases. In time-sensitive applications, these increased delays may cause significant difficulties or even render the application on the local device unusable.

Among other things, the present technology reduces the latency between the local device and the edge nodes of an edge compute network by reducing the distance between the local device and the remote computing device as well as preparing the edge node for the request prior to receiving the request. In some examples, the local device may be a mobile computing device, such as a smart phone or laptop. The mobile device thus moves with its user. As the mobile computing device moves, future locations for the mobile device may be predicted, such as by determining a direction vector for the device based on the prior locations of the device. In an example, at a first location, the mobile device may be requesting a first edge node to perform a task and provide responses. That first edge node may be the edge node that is physically closest to the first location, but the mobile computing device may be moving further away from that first edge node. Thus, a second edge node may be closer to the mobile computing device at some time in the future. By predicting the future location of the mobile computing device, computing resources may be allocated, such as initializing a service on the second edge node so that the second edge node can be prepared to continue to process requests from the mobile computing device even before the second edge node receives any requests from the mobile computing device. Thus, when the mobile computing device is closer to the second edge node, the requests can be directed to the second edge node to maintain or reduce the roundtrip path distance for the requests and responses without incurring additional delays due to the second edge node having to prepare to process the requests. Accordingly, the processing capabilities of the edge nodes effectively follow the mobile computing device to maintain or reduce latency.

In addition, the present technology is able to predict the types of requests that will be received at different edge nodes located at different physical locations. The predictions may provide for the types of requests that will be received at different times and different locations. For example, an edge node located in an urban environment may typically receive requests for performing business-related tasks during working hours but typically receive requests for streaming services during non-working hours. Different computing resources are used to perform the varying types of tasks. By predicting the request types and the times the requests will be received, the proper computing resources may be allocated in the edge node(s) prior to the requests being received. The predictions may be made through the use of machine learning and/or artificial intelligence. For example, historical request data may be aggregated for a plurality of requests. That historical request data may include data such as a time of the request, a location of a device from which the request originated, a type of service being requested, and/or a user/device identifier (such as a media access control (MAC) address). A machine learning model may then be trained from the aggregated historical request data. The trained machine learning model may then be used to make predictions for future requests and computing resources may be allocated to the edge nodes accordingly. Thus, the limited capacity of each node may be used more efficiently while also maintaining low latency for processing requests and providing computing services.

The present technology is also able to predict edge compute network capacity and hardware requirements. For example, as discussed above, predictions may be made based on the historical request data as to what types of requests will be received in the future and where those requests will be received. The present technology is also able to predict the amount of requests as well as the effect those requests may have on the network. Such predictions may be used to help ensure that the particular edge node has capacity to perform the requested services in the future. For example, the predictions may be utilized to efficiently provision hardware resources at each edge node based on the types and amounts of computing services that are predicted to be requested at each of the edge nodes. Therefore, the network itself provides feedback about its hardware needs to continue operating at high-quality performance values, such as providing services at low latency levels.

In addition to predicting the hardware resources that will be needed for the edge nodes already in place, the present technology may also be used to efficiently provision new edge nodes. The edge compute network may include a plurality of beacons that function to monitor traffic in a particular location. The beacons may be low-cost implementations that may be installed at a variety of locations, including on outdoor structures such as lamp posts or buildings. The beacons monitor traffic passing by the beacons by operating as a WiFi and/or Bluetooth beacon. In some examples, the beacons may also forward requests from authenticated users of the network to one or more of the edge nodes. By monitoring the traffic, a determination may be made as to whether an edge node should be installed at the location of the beacon. In addition, the types of hardware that should be installed at the edge node may also be identified. Thus, the use of beacons allows for the network itself to provide feedback that allows more efficient installation of the edge nodes and hardware within the edge nodes.

FIG. 1A depicts an example system 100 for which the present technology may be implemented. The depicted system 100 includes plurality of edge nodes 106 located in different physical locations of a region 104, such as a state or country. The edge nodes 106 may be part of an edge compute network. In general, an edge compute network is a network that moves the processing of certain data to the edge nodes 106 rather than at a centralized computing resource. By moving the processing capabilities of the network closer to the edge, the processing capabilities can be moved closer to the devices actually requesting the processing capabilities. One example of an edge compute network is a content distribution network (CDN).

Multiple devices or facilities may be requesting the processing capabilities of the edge computing network and the edge nodes 106 thereon. For example, the system 100 may include a plurality of mobile computing devices, such as smart phones 108 or tablets, mobile computers 110 such as laptops, and vehicles 112. While not depicted in system 100, other mobile computing devices such as drones, planes, trains, and similar computing devices that are intended to move may be present in the system 100. Stationary or fixed computing devices may also request the processing capabilities of the edge nodes 106 in the edge computing network. Such stationary computing devices may be housed or fixed within facilities such as businesses 114 or factories 116. Other facilities may include farms, ranches, housing, or other facilities that have computing devices that utilize the processing capabilities of the edge nodes 106. Other computing devices may also include devices associated with the Internet of Things (IoT), such as cameras, home assistant devices, robots, televisions, and appliances, among other devices.

The mobile computing devices and/or stationary computing devices communicate requests for different types of data processing or computing services to one or more of the edge nodes 106. The edge node 106 that receives the request processes the request and provides a response back to the computing device that sent the request. The particular edge node 106 for which the computing device may communicate may be based on the service boundaries 107 for the edge nodes 106. For example, if a smart phone 108 is within a service boundary 107 of a particular edge node 106, the smart phone 108 may send requests to that particular edge node 106.

The request data that is received by the edge nodes 106 may also be communicated to a predictive edge compute system 102. The request data that is sent to the predictive edge compute system 102 may include different types data relating to how customers or users are utilizing the processing capabilities or computing services of the edge computing network. For instance, the request data may include location information, time and date information, the customer requesting the service, the type of services requested, the bandwidth required to service the requests, and the duration for which the requests were received, among other data. The request data may include different types of protocol data as well, including data relating to layers 3-7 of the Open Systems Interconnection (OSI) model. In some examples, application-level (layer 7) data may be useful in identifying request types and the types of computing services requested. For instance, data relating to the application services may be used to identify the applications that are running and being requested on the local devices and edge nodes 106. The predictive edge compute system 102 utilizes that request data ultimately to orchestrate or allocate computing resources on the edge nodes 106. Additional information regarding the predictive edge compute system 102 is provided below with reference to FIG. 1B.

Figure 1B:
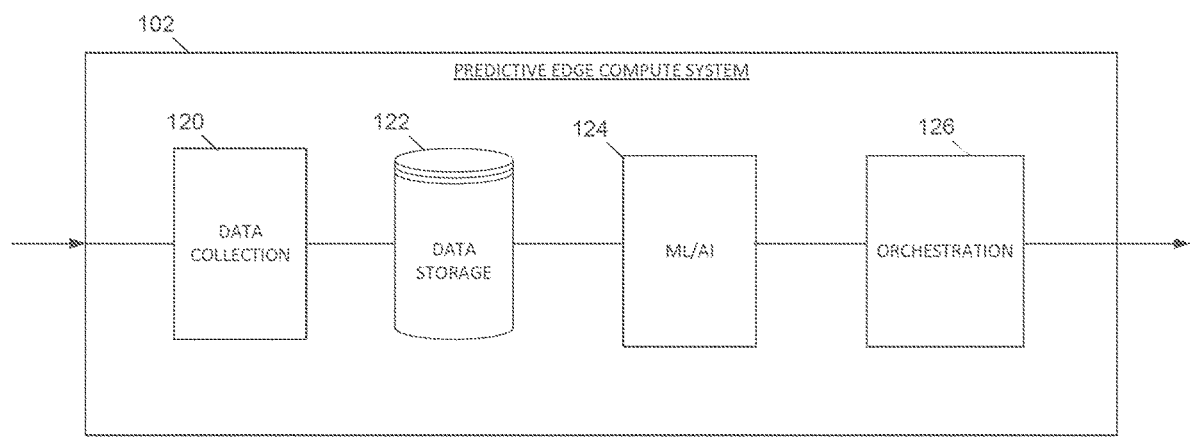
FIG. 1B depicts an example of a predictive edge compute system.

FIG. 1B depicts an example of a predictive edge compute system 102. The predictive edge compute system 102 may include a data collection component 120, a data storage component 122, a machine learning (ML) and/or artificial intelligence (AI) component 124, and an orchestration component 126. The components of the predictive edge compute system may operate together to perform one or more of the operations described herein. The data collection component 120 collects the request and/or service data from the edge nodes 106. The data collection component may modify the request data to place the request data from the different edge nodes 106 in a uniform format. The data collection component 120 may also further tag the request data with a particular data type. The data collection component 120 may also facilitate the storage of the received request data in the data storage component 122. The data storage component 122 may include at least one database and/or data store for storing the request data collected by the data collection component 120. The data storage component 122 may also include physical hardware such as physical memory of the types discussed herein. The request data may be stored in the data storage component 122 in any suitable manner that allows for retrieval and access of the request data by other components. For instance, the request data may be sorted or organized in the data storage component 122 in different manners, such as through the use of relational databases, object-oriented databases, graph databases, and/or a structured query language (SQL) database, among others.

The ML/AI component 124 accesses and utilizes the request data to predict orchestration or resource allocation needs for devices in the example system 100. In some examples, the ML/AI component 124 may already include trained ML/AI models. In other examples, the ML/AI component 124 may train ML/AI models. The ML/AI component 124 may also continue to train or update trained ML/AI models after the initial training of the ML/AI models. The machine learning techniques that are implemented by the ML/AI component may include supervised or unsupervised machine learning techniques. For instance, supervised machine learning algorithms may be utilized based on the tagged or labeled request data. The request data may include data including a request type, a request time, and a request location. Supervised machine learning techniques may then be used to train an ML/AI model to predict future times, locations, and request types, among other data. Regression-based and/or classification-based supervised learning algorithms or techniques may be implemented. Some machine learning models that may be used include decision trees, a random forests, neural networks, deep learning models, continual learning models, Markov models, linear regression models, nearest neighbor models, Gaussian Naïve Bayes models, support vector machine (SVM) models, among others.

Unsupervised machine learning techniques may also be implemented to identify additional correlations and insights that may have been previously unknown. Clustering-based, association-based, and anomaly-based unsupervised learning algorithms, among others, may all be used for the request data. Clustering algorithms are generally directed to problems where the goal is to discover inherent clusters or grouping of data, and association algorithms are generally directed to problems where the goal is to discover rules that describe large portions of request data. Anomaly detection algorithms generally are directed to discovering unusual or outlier metrics within the request data. Semi-supervised machine learning techniques may also be utilized where a portion of the request data is tagged, but some request data is not properly tagged. Reinforcement machine learning techniques and algorithms may also be implemented. In reinforcement machine learning techniques, the ML/AI model continues to be trained on a feedback system of request data.

The ML/AI component 124 provides an output that is provided to an orchestration component 126. The output of the ML/AI component 124 may be indicative of request types that are to be seen in the future at a particular location, among other data or information discussed herein. The output of the ML/AI component 124 may also be indicative of the types of the services that will be required in a particular location at a particular time. The orchestration component 126 may then use that output from the ML/AI component 124 to orchestrate the edge nodes 106. Orchestrating the edge nodes 106 may include communicating instructions from the predictive edge compute system 102 to the edge nodes 106. The instructions may include resources that should be allocated at a particular edge node 106 at a particular time. Additional details regarding network orchestration are provided in U.S. Pat. No. 9,882,833, titled "Intent-Based Services Orchestration," which is incorporated by reference herein in its entirety. For example, Network Functions Virtualization ("NFV") and virtual network functions ("VNFs") may be used to implement resource allocation for orchestration utilized by the technology described herein. Implementation of NFV and VNFs, in general, and as used in other network applications, is described in further detail in the U.S. patent application Ser. Nos. 14/730,695; 14/678,208; 14/678,280; and Ser. No. 14/678,309, which are also incorporated by reference in their entireties. In part, the orchestration operations are performed in the present technology to initialize or turn up services within a particular edge node 106.

Allocating the computing resources of the edge nodes 106 may include operations such as deploying virtualized software, virtualized instances, virtualized machines, virtualized infrastructures, and/or virtualized containers. For example, if a particular computing service requires virtualized software or a virtualized machine, that virtualized software or machine may be deployed on an edge node 106 prior to receiving requests for that particular service. Accordingly, time is not wasted loading or initializing the software for a machine when the request is received, which may lead to significant increases in latency. Allocating the computing resources may also include loading a database into memory of one of the edge nodes 106 or caching content in one of the edge nodes for a particular computing service. For example, if a particular service requires specific content, such as a streaming service, that content may be loaded at a particular edge node 106 at a time prior to the content being requested. Accordingly, the content may already be cached at the edge node 106 prior to a request for the content being received by the edge node 106. Allocating the computing resources of the edge node 106 may also include allocating storage resources in memory of the edge node 106.

Figure 1C:
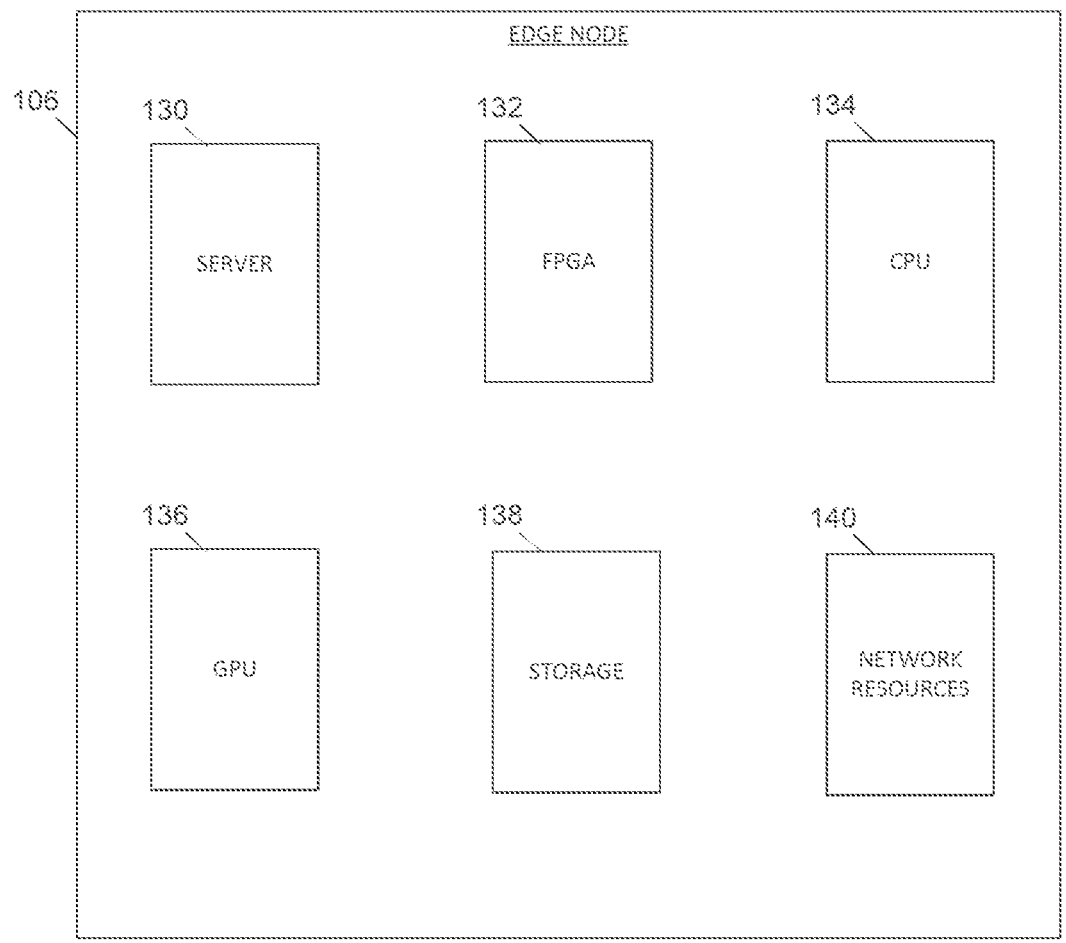
FIG. 1C depicts an example of an edge node.

FIG. 1C depicts an example of an edge node 106. The edge node 106 includes hardware and software to process requests and perform services requested by the users of the local devices. The edge node 106 include various components or features, such as a server 130, a field-programmable gate array (FPGA) 132, a central processing unit (CPU) 134, a graphics processing unit (GPU) 136, storage devices 138, and network resources 140, among other possible computing components or features. The components of the edge node 106 are configured to provide services and compute data according requests of the local devices. Accordingly, the edge node 106 performs significantly more functions beyond those functions performed by simple routers or switches. In some examples, an edge node 106 may be an endpoint of an edge compute network and may be located at locations such as gateway locations, central offices, point-of-presence (POPs) locations. Thus, as workloads, resources, and/or services are transferred to different edge nodes 106 throughout an edge compute network, those workloads may be moving to different physical locations, which allows for different portions of the edge compute network to be utilized on demand in locations that are best suited for the users making the requests.

Figure 1D:
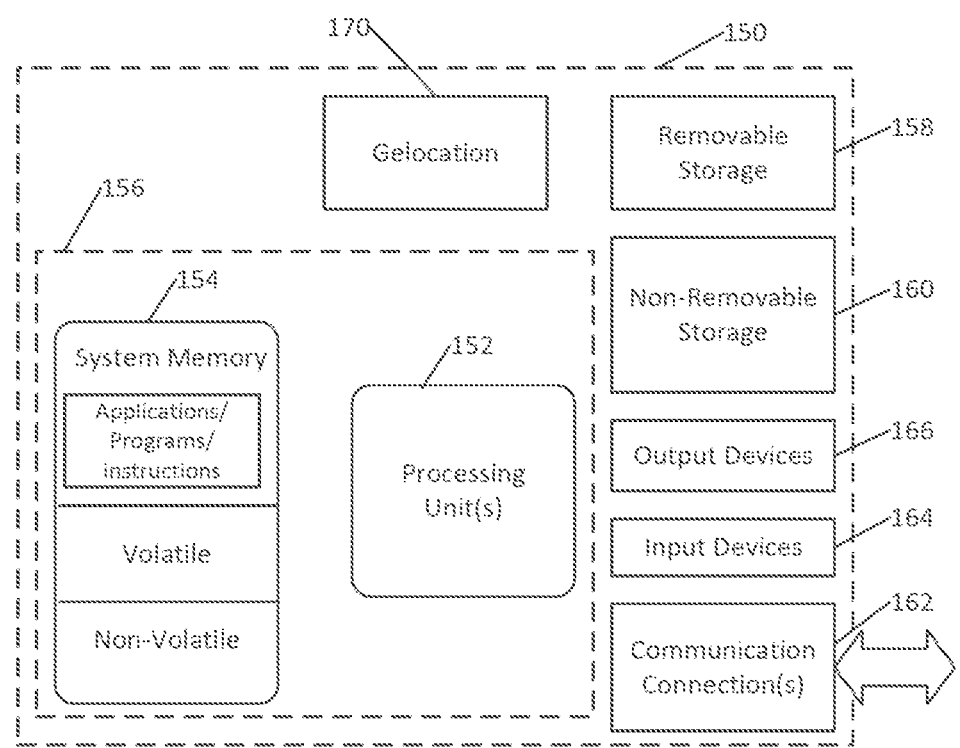
FIG. 1D depicts an example of a suitable operating environment.
Figure 5:
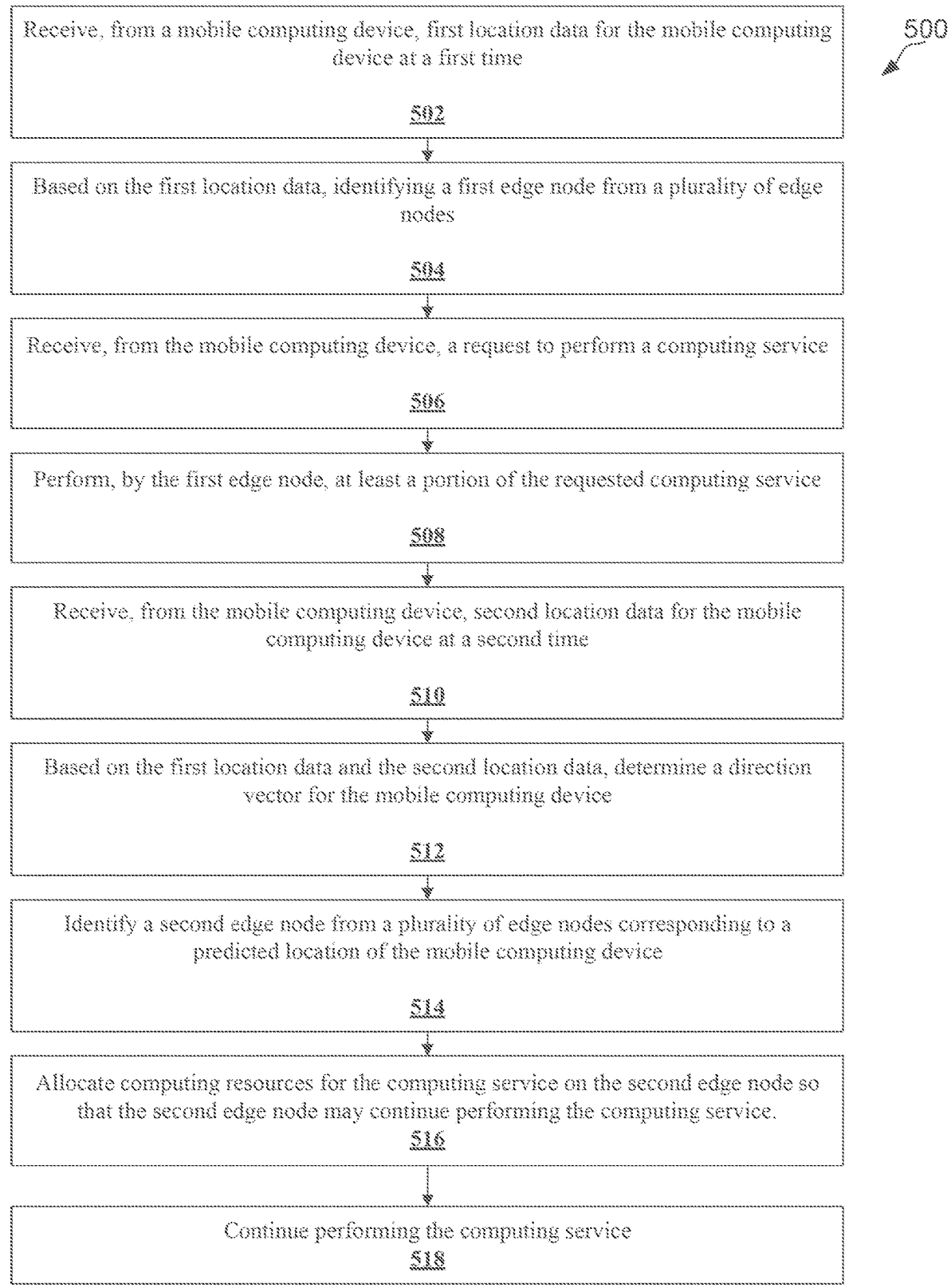
FIG. 5 depicts another example method for reducing latency in providing computing services.

FIG. 1D depicts an example of a suitable operating environment that may be implemented by an edge node 106, the local devices communicating with the edge node 106, and/or the predictive edge compute system 102. In its most basic configuration, operating environment 150 typically includes at least one processing unit 152 and memory 154. The processing unit may be a processor, which is hardware. Depending on the exact configuration and type of computing device, memory 154 (storing, instructions to perform the motion detection techniques disclosed herein) may be volatile (such as RAM), non-volatile (such as ROM, flash memory, etc.), or some combination of the two. This most basic configuration is illustrated in FIG. 5 by dashed line 156. The memory 154 stores instructions that, when executed by the processing unit(s) 152, perform the processes and operations described herein, such as generating and interpreting data signals. Further, environment 150 may also include storage devices (removable 158, and/or non-removable 160) including, but not limited to, solid-state, magnetic disks, optical disks, or tape. Similarly, environment 150 may also have input device(s) 164 such as keyboard, mouse, pen, voice input, etc. and/or output device(s) 166 such as a display, speakers, printer, etc. Additional communication connections 162 may also be included that allow for further communication with LAN, WAN, point-to-point, etc. Operating environment 150 may also include geolocation devices 170, such as a global positioning system (GPS) device.

Operating environment 150 typically includes at least some form of computer readable media. Computer readable media can be any available media that can be accessed by processing unit 152 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

Figure 2:
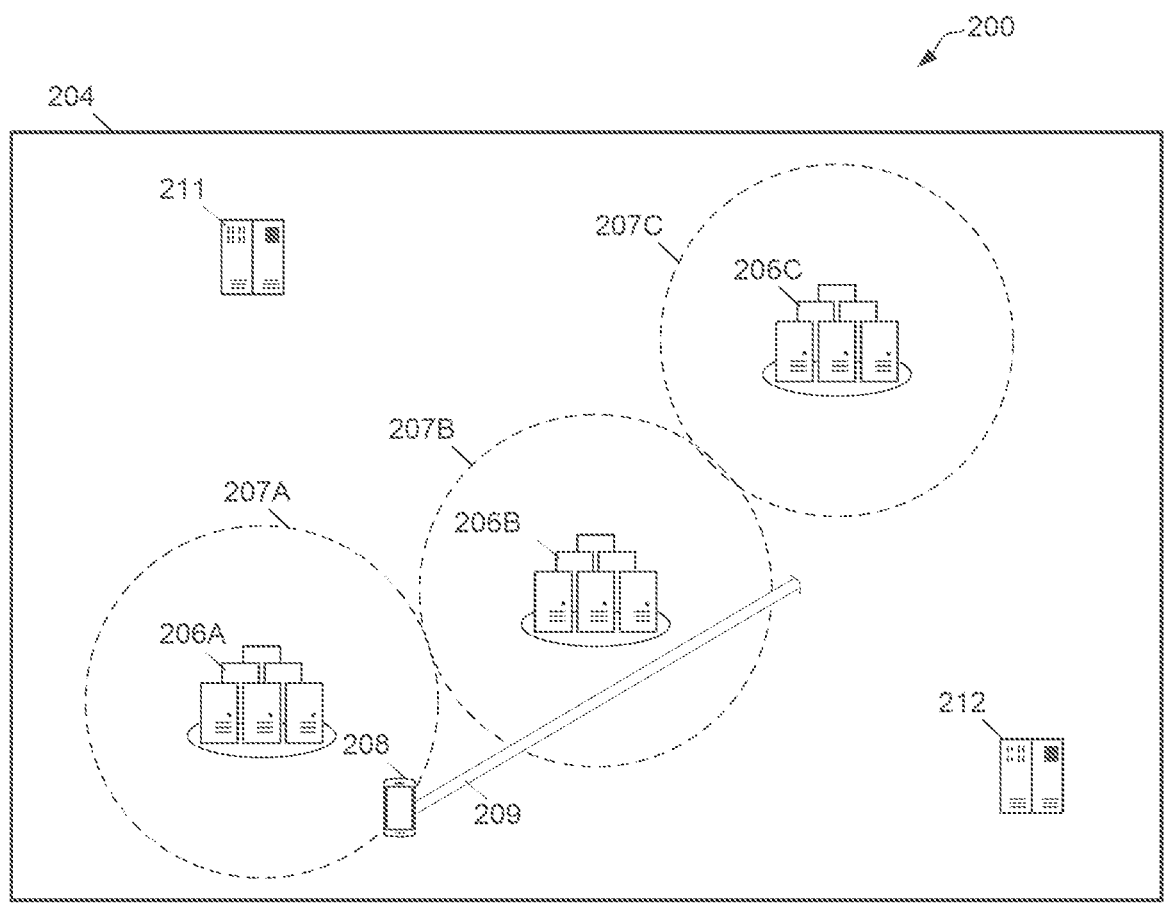
FIG. 2 depicts an example system having a mobile computing device.

FIG. 2 depicts an example system 200 having a mobile computing device 208. The example system may be similar to the example system 100 discussed above. For instance, the system 200 includes a first edge node 206A, a second edge node 206B, and a third edge node 206C. Each of the edge nodes 206 may have a service boundary 207. The first edge node 206A may have a first service boundary 207A, the second edge node 206B may have a second service boundary 207B, and the third edge node 206C may have a third service boundary 207C. The service boundaries 207 may have different sizes or configurations relative to one another. For example, an edge node 206 located in a rural area may have a larger service boundary 207 than an edge node 206 located within an urban environment. The service boundaries 207 may be statically configured to cover a specific area or the service boundaries 207 may be dynamic boundaries that change with demand and based on capacity of the corresponding edge node 206. For example, if an edge node 206 is nearing maximum capacity for a particular type of service, the corresponding service boundary may reduce in size. In addition, each edge node 206 may have multiple service boundaries 207 corresponding to different service types offered by the edge node 206. For example, if the second edge node 206B offers machine learning compute services, but the first edge node 206A and the third edge node 206C do not, the second edge node 206B may have a large service boundary 207B for machine learning compute services.

The system 200 may also include a user boundary service 211 and an edge node boundary service 212. The user boundary service 211 may be housed or provided by a separate device such as depicted in system 200. In other examples, the user boundary service 211 may be housed or provided by one of the edge nodes 206. Similarly, edge node boundary service 212 may be housed or provided by a separate device such as depicted in system 200. In other examples, the edge node boundary service may be housed or provided by one of the edge nodes 206.

The user boundary service 211 tracks or stores the location of mobile and stationary computing devices, such as mobile computing device 208. The user boundary service 211 may track the location of the computing devices by receiving location data from the mobile computing device 208 that indicates the location of the mobile computing device 208. The location data may be generated from a geolocation device, such as a GPS device, located in the mobile computing device 208. For instance, the geolocation device may generate a location of the device and provide that location with a timestamp to the user boundary service 211. The location of the mobile computing device 208 may also be determined by the user boundary service 211 in different manners as well. As some examples, the location of the mobile computing device 208 may be determined based on the IP address of the mobile computing device 208 or a WiFi access point being used by the mobile computing device 208. A user of the mobile computing device 208 may also manually input the location of the mobile computing device. The mobile computing device 208 may report its location to the user boundary service 211 at regular time intervals.

The edge node boundary service 212 tracks or stores the location of the edge nodes 206. The edge node boundary service 212 may track the location of the edge nodes 206 by receiving location data from the edge nodes 206. The location data may be generated from a geolocation device, such as a GPS device, located in the edge node 206. For instance, the geolocation device may generate a location of the device and provide that location with a timestamp to the edge node boundary service 212. The location of the edge node 206 may also be determined by the edge node boundary service 212 in different manners as well. As some examples, the location of the edge node 206 may be determined based on the IP address of the edge node 206 or a WiFi access point being used by the edge node 206. The location of the edge node 206 may also be input manually. The location of each of the edge nodes 206 may also be stored in a table and updated when, or if, the edge nodes 206 move. The edge nodes 206 may report their location to the edge node boundary service 212 at regular time intervals.

During normal usage of the mobile computing device 208, the mobile device may move throughout the region 204. The mobile device 208 may begin at a first location, such as the location of the mobile computing device 208 depicted in FIG. 2. At the first location, the mobile computing device 208 may request a remote computing service to be performed. Based on the first location of the mobile computing device 208, the request may processed and the service performed by the first edge node 206A because the first location of the mobile computing device 208 is within the first service boundary 207A of the first edge node 206A. As an example, the mobile computing device 208 may request database processing or a live stream service. The first edge node 206A may begin performing those services and providing responses to the mobile computing device 208. In traditional technology, the mobile computing device 208 would have been tied to the first edge node 206A even when the mobile computing device 208 moved. In the example of a live stream service, the service would continue to be provided by the first edge node 206A even as the mobile computing device 208 traveled a significant distance away from the first edge node 206A. In that scenario, as the mobile computing device 208 moved further away, latency increased causing interruptions in the live stream and reducing the level or quality of service being provided. The present technology improves that scenario by causing the service being performed to move with, or follow, the mobile computing device 208.

In the present technology, as the mobile computing device 208 moves, a direction vector 209 for the mobile computing device is determined or generated. The direction vector 209 may be determined by a predictive edge compute system. The direction vector 209 may be determined based on a first location of the mobile computing device 208 at a first time and a second location of the mobile computing device 208 at a second time. Based on the determined direction vector 209, a different edge node 206 is identified based on a predicted future location of the mobile computing device 208.

For example, the mobile computing device 208 may be moving in a direction towards the second edge node 206B. Prior to the mobile device 208 reaching a location within the second service boundary 207B for second edge node 206B, computing resources may be allocated on the second edge node 206B such that the second edge node 206B can begin processing requests from the mobile computing device once it is within the second service boundary 207B. The resources allocated on the second edge node 206B may be the same or similar to the resources of the first edge node 206A being used to process the requests or perform the compute operations requested by mobile computing device when the mobile computing device 208 is in the first location. Accordingly, the service can continue to be provided to the user without interruption and with a consistently low latency as the mobile computing device 208 moves around the region 204. For instance, if a service is initialized or turned up at the first edge node 206A, that same service may be initialized or turned up at the second edge node 206B based on a prediction that the mobile computing device will be within the second service boundary 207B due to the movement of the mobile computing device 208. Once the mobile computing device 208 has reached the second service boundary 207B and the requested service is being provided by the second edge node 206B, the service can be stopped on the first edge node 206A and the resources that were allocated to perform the service on the first edge node 206A may then be used to perform other services for other users.

An aggregated or cluster-based direction vector may also be generated for a plurality of mobile computing devices moving throughout the region 204. For instance, the locations of multiple mobile computing device may be utilized to determine an aggregate direction vector. That aggregate direction vector may then be used to predict the future location of multiple computing devices. Aggregate direction vectors may also be generated based on different types of services being requested by mobile computing devices. For example, a first aggregate direction vector may be generated for the mobile computing devices requesting a database processing service and a second aggregate direction vector may be generated for the mobile computing devices requesting a live streaming service. The resources required to perform the database processing service may be different than the resources required to perform the live streaming service. For instance, the database-based request may require the loading the database into memory of an edge node 206. Accordingly, predicting the location where each those services will be requested allows for the appropriate resources to be allocated at the appropriate edge node 206.

Initializing services or allocating resources at each of the edge nodes 206 based on such predictions allows for a more efficient use of the hardware resources that are available at each of the edge nodes 206. Each edge node 206 has a limited amount of capacity due to the hardware resources available at each edge node 206. Accordingly, not every service that could be requested by a user may be initialized and operating at all times at all edge nodes 206. Even if such a perpetual operation of all services at all locations was possible, such an implementation would likely be a significantly inefficient use of power and hardware resources. With the present technology, the hardware resources of the edge nodes 206 are used more efficiently while also reducing the latency for communications within the edge compute network and users' computing devices for which the edge compute network is performing the services.

Figure 3A:
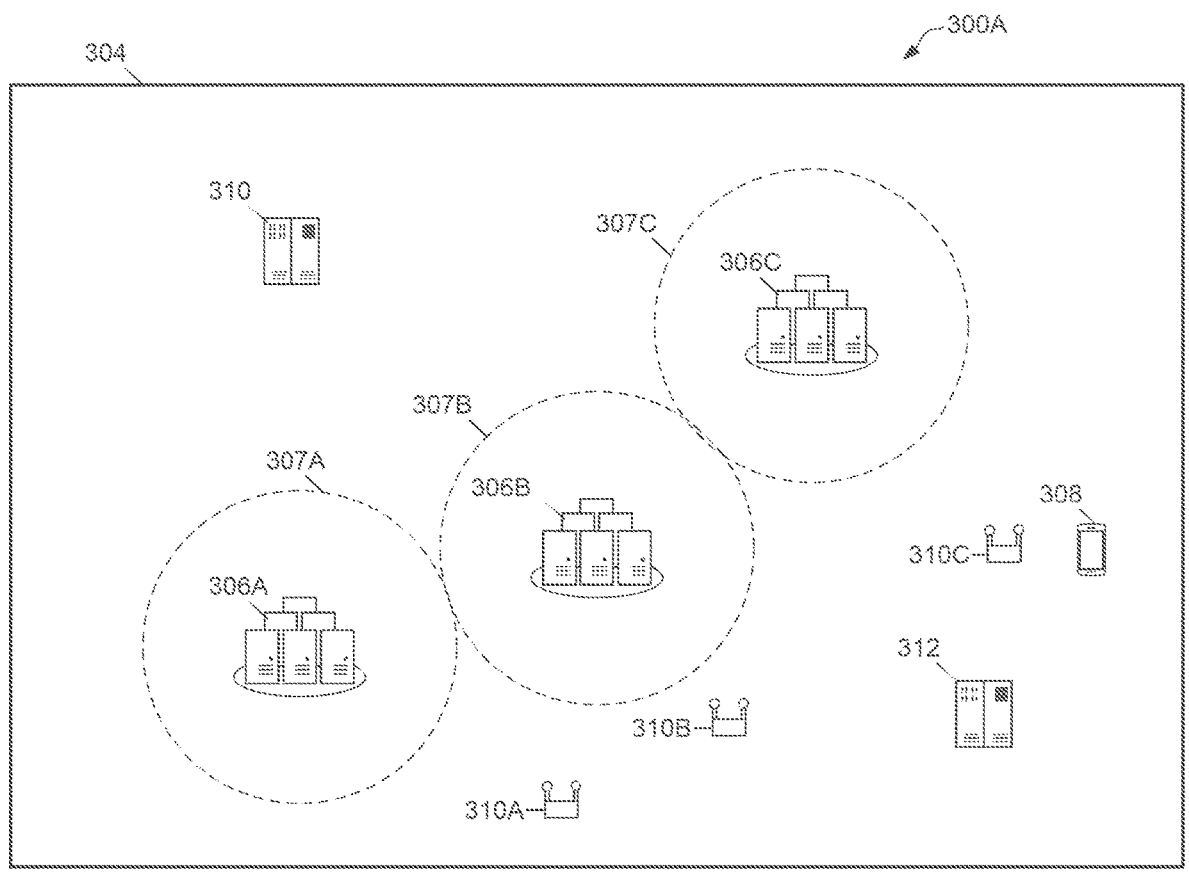
FIG. 3A depicts an example system having a plurality of beacons.

FIG. 3A depicts an example system 300A having a plurality of beacons 310. The system 300A is similar to system 100 and system 200 discussed above with the exception that system 300A includes a plurality of beacons 310. The beacons 310 serve as network probes to predict and determine potential future growth of the edge compute network. For instance, the beacons 310 may monitor devices that pass by the beacons 310. That information may then be used to predict the need for another edge node 206 at or near the location of one or more of the beacons 310. The beacons 310 may be located in positions that are not already well-covered by one or more edge nodes 206. The beacons may also be placed near areas of potential high traffic of computing devices, such as roadways, waterways, shipping lanes, flight paths, etc.

Each of the beacons 310 may include wireless connectivity and/or wired connectivity components, such as WiFi, Bluetooth, Ethernet, 100BaseT, and/or GigE connections. The beacons 310 may include wireline or wired interfaces to allow for the wired connections, such as Ethernet-based connections. The beacons 310 may also include cellular data interfaces to allow for cellular connections and cellular data services, such as 3G, 4G, and/or 5G cellular data services. The beacons 310 may also include memory and storage devices along with some processing components, such as a processor. In some examples, the primary components of the device may be made from a miniature computer, such as a Raspberry Pi, Jetson Nano, or similar device. Each of the beacons 310 may also be environmentally hardened to protect against weather and the elements. For example, the beacons 310 may be waterproof or water resistant, resistant to high or low temperatures, and/or shock resistant. By environmentally hardening the beacons 310, the beacons 310 may be placed in outdoor environments, such as on light posts, buildings, towers, or any other outdoor structures. The beacons 310 may also include alternative power sources to allow for remote usage. For instance, the beacons may include batteries and solar cells to allow the batteries to recharge. Wind-based charging components, such as a small turbine, may also be included to recharge the batteries of the beacons 310. The beacons 310 may also have additional external physical connection features or adhesives to allow for connection to outdoor structures.

The beacons 310 may monitor traffic passing by the beacons 310 by monitoring requests for an access point or connection. For example, the beacons 310 may each operate as a WiFi beacon and/or a Bluetooth beacon by broadcasting the presence of the network, such as by broadcasting a service set identifier (SSID) or Bluetooth name. Mobile computing devices 308 that utilize active scanning also announce their presence to the beacons 310 as they pass by the beacons 310. For example, a WiFi or Bluetooth-enabled mobile computing device 308 may transmit a probe request to the beacons 310. In response, the beacons 310 may transmit a probe response to the mobile computing device 308. The probe request sent by the mobile computing device 308 to the beacon may include identifying information about the mobile computing device 308. The identifying information may include a unique identifier for the device, such as a media access control (MAC) address, an Organizationally Unique Identifier (OUI), an Individual Address Block (IAB), Extended Unique Identifier (EUI), a cookie, or similar identifiers. From the unique identifier, the manufacturer of the mobile computing device 308 that sent the probe request may be identified, and in some examples the type of mobile computing device 308, including the model of the mobile computing device 308, may be determined or identified. For instance, in a MAC address, the first three octets identify the manufacturer. The first three octets of the MAC address may represent the OUI. Accordingly, each of the beacons 310 are able to identify the amount of devices and the types of devices that pass by each of the beacons 310.

With the amount of devices and the types of the devices that pass by each of the beacons 310, a determination may be made as to whether a new edge node should be placed at or near the location of a particular beacon 310. For example, if a high number or an increasing number of devices are passing by a particular beacon, a new edge node may be needed at the location of the beacon 310. The data regarding the types of devices that pass by the beacons 310 further allows for a prediction of the hardware that should be installed in the new edge node. For example, the request data gathered by the predictive edge compute system may also include the types of devices that are sending the requests along with the types of requests that are being sent from those devices. Accordingly, a determination may be made as to what types of devices most frequently request what types of computing services. Thus, by having the types of devices that are passing by the beacons 310, a prediction may be made as to the likely types of requests that would be generated by those devices. Based on the likely types of services that are requested, the types of hardware required for newly installed edge nodes may be determined. Therefore, the edge compute network may be expanded in a more efficient manner based on predictions and data generated from the network itself.

In some examples, the beacons 310 may also serve as access points to the Internet and/or the edge compute network. In such examples, users or mobile computing devices that are previously associated with the service provider operating the beacons 310 and/or the edge compute network may join the network of the beacons 310 either through WiFi, Bluetooth, or any other communication type supported by the beacons 310. For instance, the beacons 310 may also have wireline connections as well as cellular connections and data services, such as 3G, 4G, and/or 5G connectivity and data services. For example, customers of the edge compute network may be authenticated by the beacons 310 and allowed to join the WiFi or Bluetooth network of the beacons 310. In such examples, the beacons 310 may act as a forwarding device that forwards requests from the mobile computing devices to one or more of the edge nodes 306. As an example, a mobile computing device 308 may join the network offered by the beacon 310C. The mobile computing device 308 may then send a request to the edge compute network to perform a computing service. The beacon 310C may forward that request on to an edge node 306 to process the request and/or perform the service, such as edge node 306C. The beacon 310C differs from the edge nodes 306 in that the beacon 310C does not process the requests or perform the requested services that are received, and the beacon 310C may not have the capabilities to process the requests or perform the requested services.

When a beacon 310C forwards the request to the edge node 306, the beacon 310C extracts data from the request, such as the time of the request, the location of the request, the type of service requested, a unique identifier for the mobile computing device 308, the particular edge node 306 where the request was forwarded, and other types of request data discussed herein. The beacon 310C may also extract a user or device identifiers from the received requests. By extracting the user or device identifiers, the system is able to track which users or devices are requesting certain types of services and at what times those users are requesting those services. The beacon 310C may extract such data from each request received from each of the devices that have joined the network offered by the beacon 310C. Thus, the beacon 310C is able to keep a historic record of the usage and traffic that passes through the beacon 310C.

Based on the extracted data, the number of requests that are received near the beacon 310C as well as the types of services that are requested may be determined. If the number of requests exceeds a predetermined traffic threshold, then a recommendation to install a new edge node 306 at the location of the beacon 310C may be generated. A recommendation to install the new edge node 306 may also be based on a rate of change of the number of requests that are received near or at the beacon 310. An ML/AI model may also be trained based on the extracted request data, and used to generate a predicted future number of requests. The rate of change of the number of requests and/or the predicted number of future requests may also be used in determining whether to generate a recommendation to install the new edge node 306. For example, if the rate of change or the predicted number of future requests exceeds a predetermined threshold, then a recommendation to build the new edge node 306 at the location of the beacon 310C may be generated.

The extracted types of service requested may also be used to generate a recommendation for a hardware allocation for the edge node. For example, when the request types include web requests, the recommended hardware allocation may be for web servers. When the request types include streaming requests, the recommended hardware allocation may include streaming servers. When the request types include AI requests, the recommended hardware allocation may include specialized accelerators, such as GPU-based chips or cards, or similar devices suited for handling AI-related requests. The foregoing request types and recommended hardware allocations are not meant as limiting, but rather are provided as examples.

Other performance related factors may also be determined, such as the total distance the forwarded requests have to travel to be processed by an existing edge node 306. For example, the beacons may communicate with the edge node boundary service 312 and provide the location of the beacons 310 to the edge node boundary service 312. The locations of the beacons 310 may be provided to the edge node boundary service 312 in the same or similar manner as the locations of the edge nodes 306 are provided to the edge node boundary service 312, as discussed above. The request data extracted from the beacon 310 may also include an identification of the particular edge node 306 to which the request was forwarded by the beacon 310. Because the location of the particular edge node 306 is known by the edge node boundary service 312 and the location of the beacon 310 forwarding the request is also known by the edge node boundary service 312, the distance between the beacon 310 and the particular edge node 306 may also be known or determined. The distance may be a physical difference between the two locations or the physical distance the request must travel through the network. Performance metrics, such as latency, may also be tracked by the beacon 310 for the requests that are forwarded. The latency data may also be indicative of distance. The distance and/or performance metrics extracted by the beacon 310 may then be used in the determination as to whether a new edge node 306 should be installed at the location of a beacon 310.

Figure 3B:
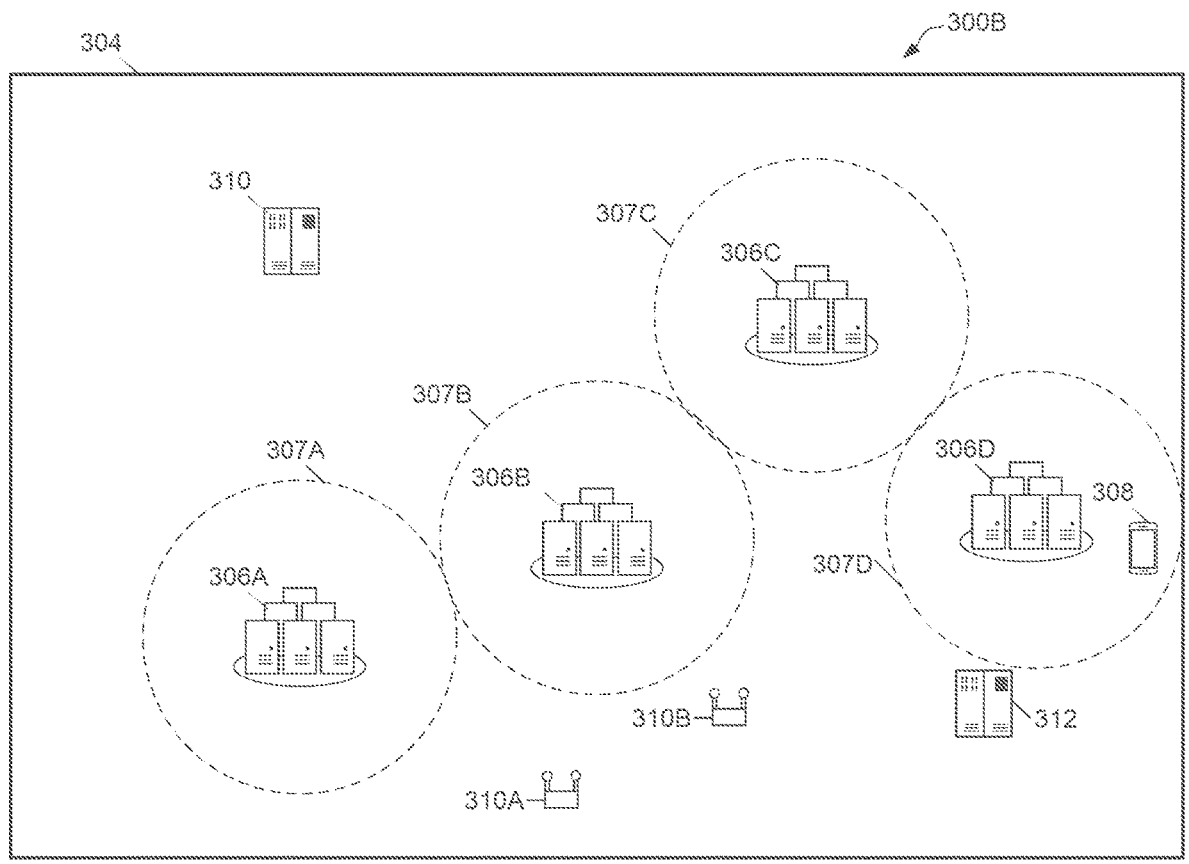
FIG. 3B depicts another example system having a plurality of beacons.

As a specific example, the beacon 310C may receive a large number of probe requests from a plurality of devices and/or a large number of requests that are to be forwarded to an edge node 306 for processing. Due to the large number of requests, a recommendation may be generated to replace the beacon 310 with another edge node 306. FIG. 3B depicts an example system where a new edge node 306D has been installed in place of the beacon 310C. The new edge node 306D has a corresponding service boundary 307D. By installing the new edge node 306D, computing devices, such as mobile computing device 308, near the new edge node 306D may experience reduced latencies for service requests from the edge compute network because the requests can be processed more closely to the computing devices. Accordingly, once the new edge node 306D is installed, requests can be processed by the edge compute network with lower latencies. In addition, the installation of the new edge node 306D was made due to proven need for the new edge node 306D that was generated by the components of the edge compute network itself. Thus, resources are not wasted in installing edge nodes 306 where there is no need for an edge node 306.

Figure 4:
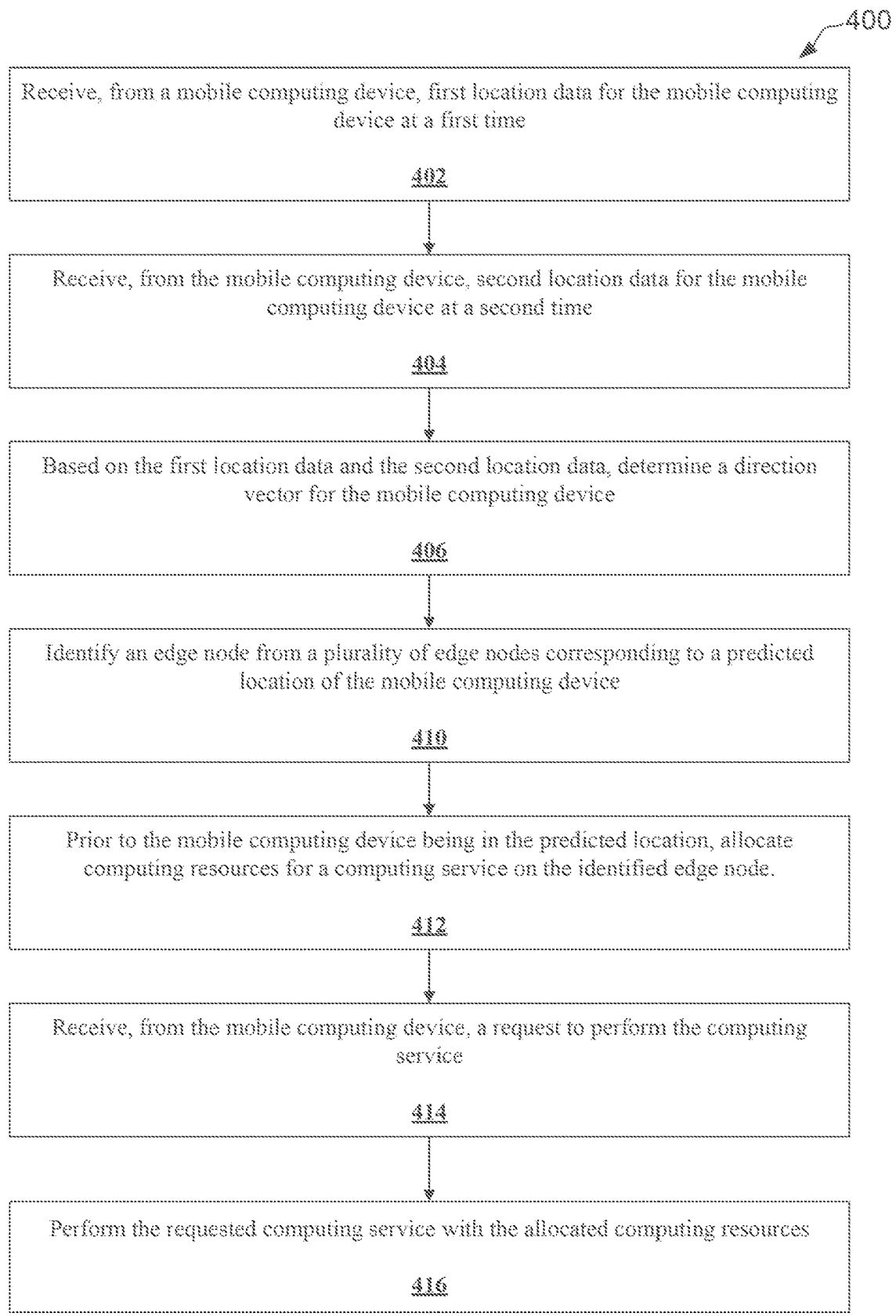
FIG. 4 depicts an example method for reducing latency in providing computing services.

FIG. 4 depicts an example method 400 for reducing latency in providing computing services. The operations depicted in example method 400 may be performed by a predictive edge compute system, an edge node, a boundary service, another computing device communicatively connected to a mobile computing device, and/or a combination thereof. At operation 402, first location data for a mobile computing device at a first time may be received from the mobile computing device. At operation 404, second location data for a mobile computing device at a second time may be received from the mobile computing device. The mobile computing device may be a smart phone, laptop, vehicle, drone, mobile computer, or a plane, among other types of mobile computing devices.

Based on the first location data and the second location data, a direction vector for the mobile computing device may be determined or generated in operation 406. The direction vector may be indicative of a direction that the mobile computing device is travelling and a speed at which the mobile device is traveling. Thus, from the direction vector, a future location of the mobile computing device may be predicted. The direction vector may also be based on other data in addition to the first location data and the second location data. For example, the direction vector may be based on additional location data for the mobile computing device. The direction vector may also be based on mapping data that indicates the mobile computing device is travelling along a known roadway, waterway, railway, or similar constrained transportation feature. In such examples, the direction vector may be modified to match the shape or features of the transportation feature. The direction vector may also be based on historical location data for the mobile device. For example, a mobile device may travel a predictable route at certain times of day that track habitual movements of the user, such as a work commute In addition, the direction vector may be based on an aggregation or clustering of location data from a plurality of devices. For example, location data may be received from an additional mobile computing device for similar times as the first mobile computing device. The direction vector may then be based on the additional location data for the additional mobile computing devices. In examples where location data is collected from multiple devices and/or users, a unique identifier may be assigned or correlated with each of the devices and/or users to allow for separation of the location data and to allow for tracking of individual users and/or individual devices. The unique identifier may be any of the unique identifier discussed herein, included a MAC address and/or a cookie.

At operation 410, based on the direction vector, an edge node from a plurality of edge nodes in the edge compute network is identified that corresponds to a predicted location of the mobile computing device. Identifying the edge node in operation 410 may include accessing service boundaries for the plurality of edge nodes in the edge compute network. The direction vector and/or the predicted location of the mobile computing device may then be compared to the service boundaries for the plurality of edge nodes. Based on the comparison of the direction vector and/or the predicted location of the mobile computing device to the service boundaries, the edge node may be identified. For instance, the predicted location of the mobile computing device may lie within one of the service boundaries. The edge node for which the service boundary corresponds is then identified as the edge node.

At operation 412, once the edge node is identified, computing resources for a particular computing service are allocated on the identified edge node. The computing resources are allocated prior to the mobile device actually being in the predicted location. The timing of the allocation of resources may also be based on the direction vector as the resources are to be allocated before the mobile computing device arrives in the predicted location. For example, the computing resources may be allocated prior to the mobile computing device entering the service boundary for the identified edge node. Allocating resources on the identified edge node may include actions such as deploying a virtualized software, deploying a virtualized instance, deploying a virtualized machine, deploying virtualized infrastructure, deploying a virtualized container, loading a database into memory of the identified edge node, caching content for the computing service, and/or allocating storage resources in memory of the identified edge node, among other resource allocation actions discussed herein. For example, the computing service may be a database-based service and allocating the computing resources includes loading the corresponding database into memory of the identified edge node. Loading a database of considerable size may take a considerable amount of time. Thus, if the database was not loaded prior to receiving a request for the service, the latency for performing the requests would be considerably increased.

At operation 414, subsequent to the allocation of the computing resources on the identified edge node, a request to perform the computing service is received from the mobile computing device. The request may be received when the mobile computing device is in the predicted location and/or at a predicted time based on the direction vector. At operation 416, the requested computing service is performed by the identified edge node using the resources that were allocated in operation 412. Log files for the requests that are received and the services that are performed may also be generated and stored during performance of method 400. The log files may include the types of request data discussed herein including data regarding the users making the requests, unique identifiers for the users and/or the mobile computing devices making the requests, the time the requests are being sent, the types of services being requested, and the location from which the requests are generated, and the location of the edge node performing the services, among other types of data. Those log files may then be provided as feedback into the predictive edge compute system to improve the system and further train the ML/AI models discussed herein. In some examples, if a request for a service corresponding to the allocated resources is not received within a predetermined time frame, the allocated resources may be reallocated for another service or deallocated to conserve resources.

FIG. 5 depicts another example method 500 for reducing latency in providing computing services. The operations depicted in example method 500 may be performed by a predictive edge compute system, an edge node, a boundary service, another computing device communicatively connected to a mobile computing device, and/or a combination thereof. At operation 502, first location data for a mobile computing device at a first time may be received from the mobile computing device. The mobile computing device may be a smart phone, laptop, vehicle, drone, mobile computer, or a plane, among other types of mobile computing devices.

At operation 504, a first edge node from a plurality of edge nodes in an edge compute network is identified. The first edge node may be identified by comparing the first location data to the service boundaries for the plurality of edge nodes. For example, the service boundaries for the plurality of edge nodes may be accessed, and the first location may be compared to the service boundaries. Based on the comparison of the first location to the service boundaries, the first edge node may be identified because the first location is within the service boundary of the first edge node.

At operation 506, a request is received, from the mobile computing device, to perform a computing service. The computing service may be any of type of computing services discussed herein, among others that will be understood by those having skill in the art. At operation 508, at least a portion of the requested computing service is performed by the first edge node. For example, the first edge node may begin a live-streaming service or begin processing AI requests.

At operation 510, second location data for the mobile computing device is received at a second time from the mobile computing device. At operation 512, a direction vector is determined or generated based on the first location data and the second location data. The direction vector may be generated or determined in the same or similar manner as discussed above. At operation 514, based on the determined or generated direction vector, a second edge node from the plurality of edge nodes may be identified that corresponds to a predicted future location of the mobile computing device. For example, the direction vector may be used to predict a location for the mobile computing device for a time in future, such as a third time. Identifying the second edge node in operation 514 may include accessing service boundaries for the plurality of edge nodes in the edge compute network. The direction vector and/or the predicted location of the mobile computing device may then be compared to the service boundaries for the plurality of edge nodes. Based on the comparison of the direction vector and/or the predicted location of the mobile computing device to the service boundaries, the second edge node may be identified. For instance, the predicted location of the mobile computing device may lie within service boundary of the second edge node.

At operation 516, computing resources for the computing service are allocated on the second edge node so that the second edge node may continue performing the computing service when the mobile computing device nears the second edge node. The computing resources may be allocated prior to the mobile computing device actually being in the predicted location or within the service boundary of the second edge node. The timing of the allocation of resources may also be based on the direction vector and/or predicted location as the resources are to be allocated before the mobile computing device arrives in the predicted location and/or the service boundary for the second edge node. Allocating the resources on the second edge node may include any of the allocation actions discussed herein. The resources allocated, however, may be based on the resources utilized by the first edge node. For example, if the first edge node required a particular virtual machine to be deployed in order to perform the requested computing service, allocating resources on the second edge node may include deploying the same particular virtual machine. Thus, the computing resources required for the computing service can effectively follow the mobile computing device as the mobile computing device moves throughout a region.

At operation 518, the second edge node continues performing the computing services and providing responses to the mobile computing device once the mobile computing device is within the service boundary of the second edge node. In some examples, the computing resources of the first edge node may be stopped, deallocated, or reallocated as they may no longer be required because the mobile computing device is now sending requests to the second edge node. Accordingly, resources may be conserved on edge nodes when they are not needed.

Log files for the requests that are received and the services that are performed may also be generated and stored during performance of method 500. The log files may include the types of request data discussed herein including data regarding the users making the requests, unique identifiers for the users and/or the mobile computing devices making the requests, the time the requests are being sent, the types of services being requested, and the location from which the requests are generated, and the location of the edge node performing the services, among other types of data.

Figure 6:
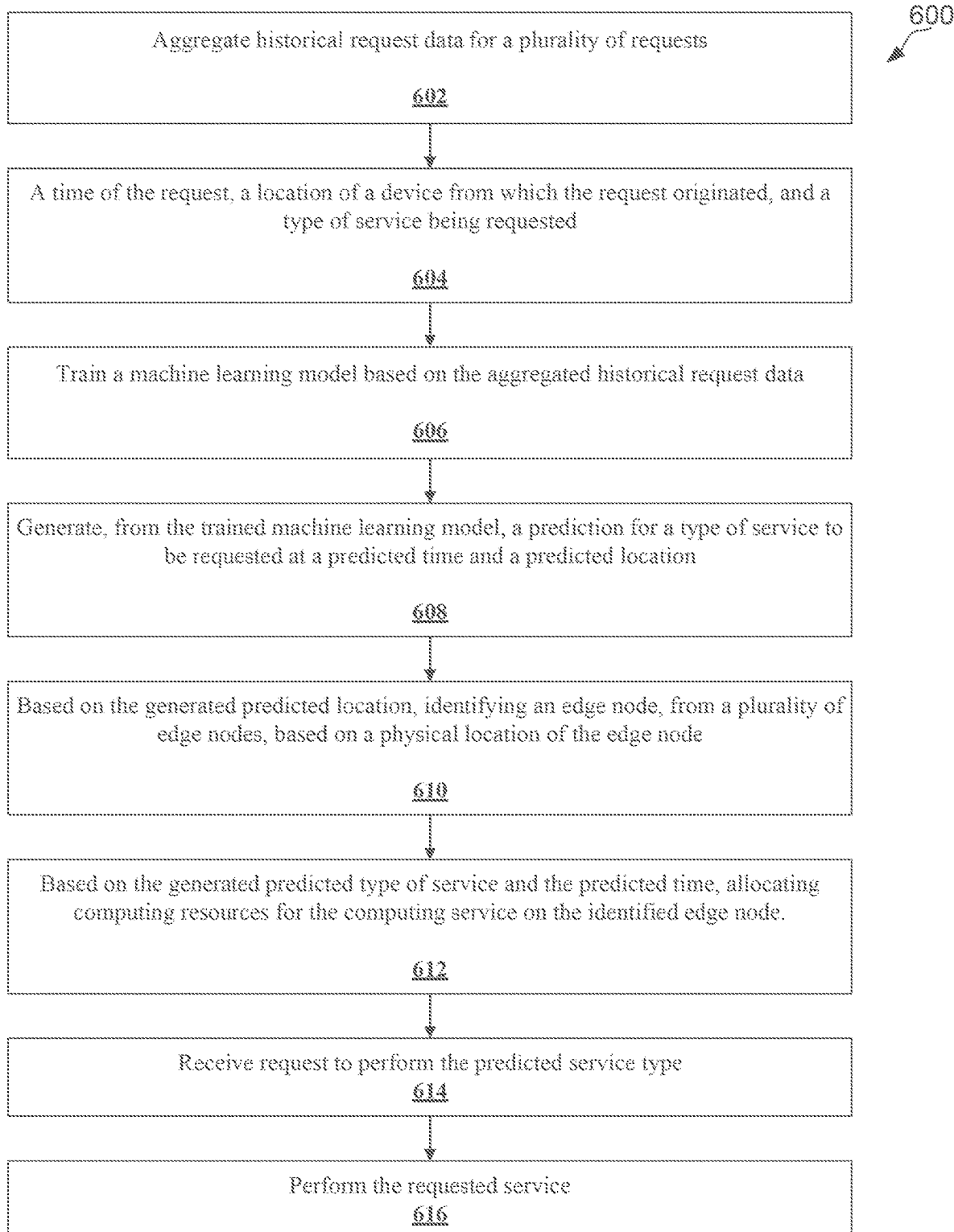
FIG. 6 depicts another example method for reducing latency in providing computing services.

FIG. 6 depicts another example method 600 for reducing latency in providing computing services. The operations depicted in example method 600 may be performed by a predictive edge compute system, an edge node, a boundary service, another computing device communicatively connected to a mobile computing device, and/or a combination thereof. At operation 602, historical request data may be aggregated for a plurality of prior requests to perform computing services. The aggregated historical request data may include a variety of types of request data discussed herein. For example, the aggregated historical request data may include, for a plurality of prior requests, a time of the request, a location of the device from which the request originated, and a type of service being requested, among other types of request data.

At operation 604, a machine learning model may be trained based on the aggregated historical request data. The machine learning model may be any type of ML/AI model discussed herein. For example, the machine learning model may be at least one of a decision tree, a continual learning model, a random forest, a neural network, or a deep learning model. Training the machine learning model may be performed in a variety of different methods and may be altered based on the type of model being trained, as will be appreciated by those having skill in the art. For example, training machine learning model may include splitting the aggregated historical request data into a training data set and test data set. The training set is used to train or fit the machine learning model, and the test is used to evaluate to effectiveness or accuracy of the trained machine learning model. Training the machine learning model results in different parameters within the machine learning model to be adjusted, such as regression coefficients, weights in a neural network, splitting points in a decision tree, among other parameters. During the training process, hyperparameters for the particular model may also be set or adjusted. For example, the number of decision trees to be used may be a hyperparameter that is set when the machine learning model is a random forest. Other examples of hyperparameters include the number of hidden layers in a neural network and the strength of a penalty used in regression. The machine learning models may also be tuned utilizing cross-validation techniques, and the model may be trained to reduce errors that may be evaluated using techniques such a mean squared error and/or area under the receiver operating characteristics. Those having skill in the art will appreciate and understand additional or different aspects involved in training machine learning models based on a set of data.

At operation 608, a prediction for a type of service to be requested at a predicted time and a predicted location in the future is generated from machine learning model trained in operation 606. For instance, real-time data may be passed as an input into the trained machine learning model to receive the prediction as an output from the trained machine learning model. As an example, the real-time (e.g., current) requests that are being received by the edge nodes in the edge compute network may be received by the predictive edge compute system and provided to trained machine learning model of the ML/AI component, which produces the prediction for the type of service to be requested at the predicted time and the predicted location. For example, a future location of a mobile device and a type of service to be requested by that mobile device may be generated based on historical usage data for the device of that mobile device. For example, a mobile device may travel a predictable route at certain times of day that track habitual movements of the user, such as a work commute. The prediction may also be for multiple requests. For example, the prediction may include the predicted service type, the predicted location, and/or the predicted time for a plurality of requests to be received in the future. Thus, orchestration or resource allocation decisions may be based on a prediction of an aggregate of predicted requests. The prediction data generated at operation 608 may then be passed to an orchestration component of the predictive edge compute system which may orchestrate the allocation of resources at one or more of the edge nodes in operations 610-612.

At operation 610, based on the predicted location generated in operation 608, an edge node from a plurality of edge nodes in an edge compute network may be identified. The identification of the edge node in operation 610 may be further based on the physical location of the edge node. For example, a comparison of the predicted location may be compared to the service boundaries of the plurality of edge nodes. The edge node that is identified may be the edge node that has the service boundary that encompasses the predicted location.

At operation 612, computing resources may be allocated at the identified edge node based on the predicted service type and the predicted time generated in operation 606. Allocating the computing resources on the identified edge node may include any of the allocation actions discussed herein. The allocation of the computing resources may be performed prior to the predicted time such that a service corresponding to the predicted service type may be initialized or turned up prior to a request for the service, or a bulk of requests for the service, being received at the identified edge node. Thus, the machine learning models and systems are able to predict when, where, and how users will use the edge nodes in the edge compute networks hours or days in advance. By initializing the services prior to the services being requested, the present technology is capable of providing service before real-time requests are received—effectively providing real-time before real-time performance.

At operation 614, a request is received from a computing device to perform the predicted service type. The request may be received after the allocation of resources in operation 612. The request may also be received at or substantially near the predicted time generated in operation 608. The computing device generating the request may be any of the computing devices discussed herein, including the computing devices discussed above with reference to FIG. 1A. For example, the computing device generating the request may be a mobile computing device, such as a smart phone, laptop, vehicle, drone, mobile computer, or a plane. The computing device may also be a stationary computing device, such as a computing device at a home, business, factory, or farm. At operation 616, the identified edge node performs the requested service with the allocated computing resources.

Figure 7:
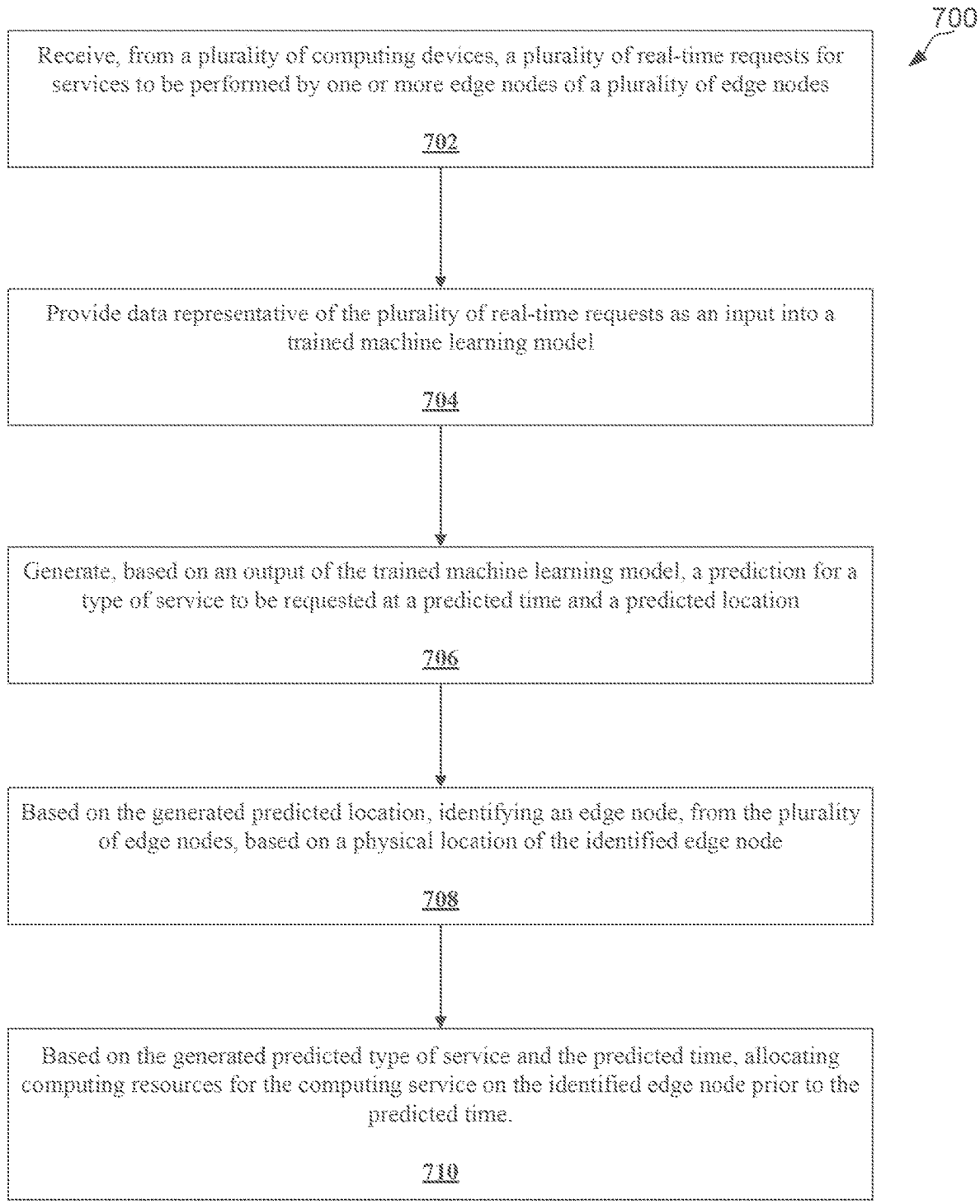
FIG. 7 depicts another example method for reducing latency in providing computing services.

FIG. 7 depicts another example method 700 for reducing latency in providing computing services. The operations depicted in example method 700 may be performed by a predictive edge compute system, an edge node, a boundary service, another computing device communicatively connected to a mobile computing device, and/or a combination thereof. At operation 702, a plurality of real-time requests are received from a plurality of computing device. The plurality of real-time requests may be for computing services to be performed by one or more edge nodes of a plurality of edge nodes in an edge compute network. At operation 704, data representative of the plurality of real-time requests is provided as input to a trained machine learning model. The trained machine learning model may be a machine learning model trained on aggregated historical request data, such as the trained machine learning models discussed herein and above with reference to method 600 depicted in FIG. 6.

At operation 706, a prediction for a type of service a prediction for a type of service to be requested at a predicted time and a predicted location in the future is generated from the trained machine learning model. The predictions may be for a plurality of requests from a plurality of devices. At operation 708, based on the predicted location generated in operation 706, an edge node from a plurality of edge nodes in an edge compute network may be identified. The identification of the edge node in operation 708 may be further based on the physical location of the edge node. At operation 710, computing resources may be allocated at the identified edge node based on the predicted service type and the predicted time generated in operation 706. Allocating the computing resources on the identified edge node may include any of the allocation actions discussed herein. Operation 708 and 710 may be substantially similar to operations 610 and 612 of method 600 depicted in FIG. 6.

Figure 8:
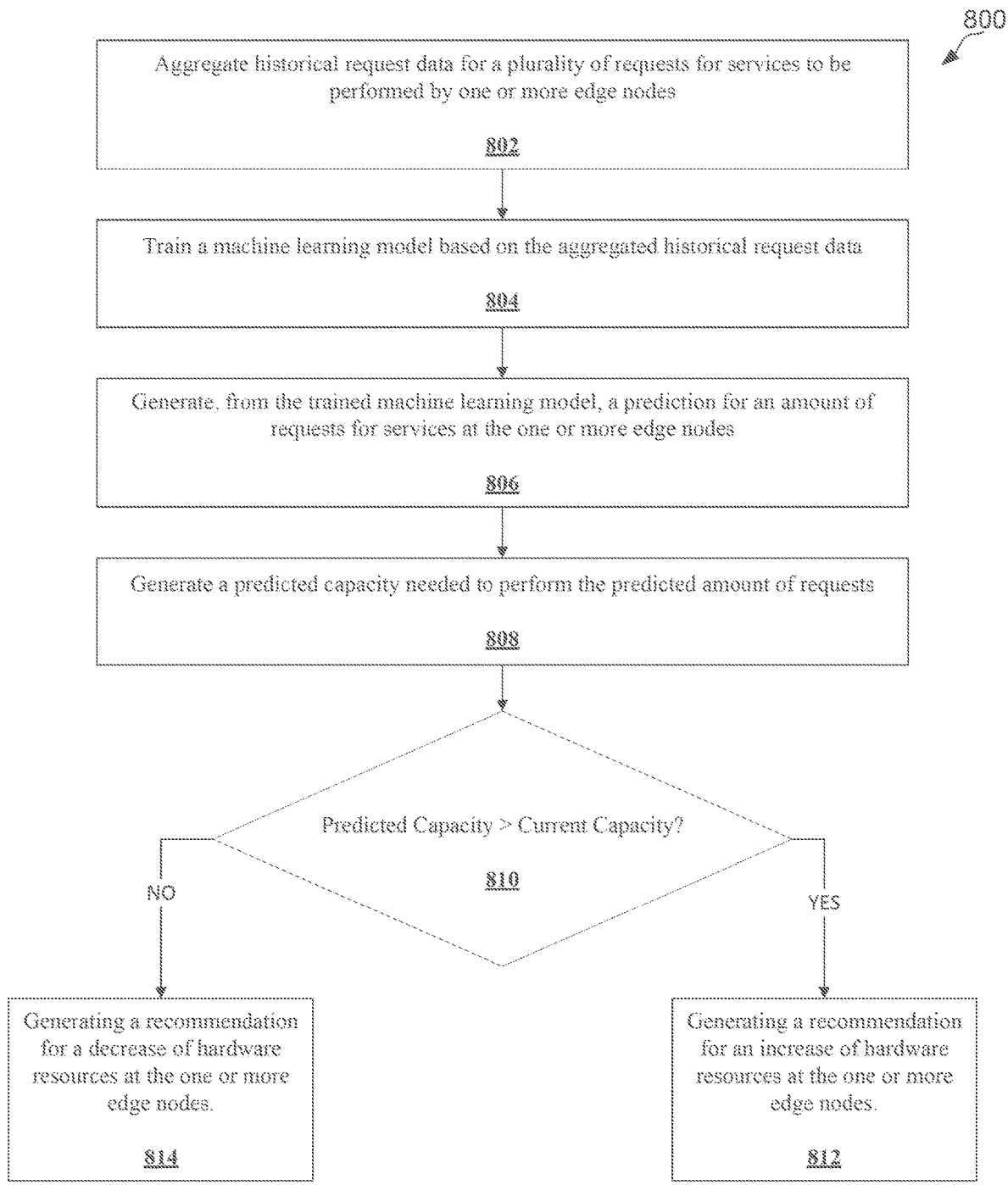
FIG. 8 depicts an example method for allocating hardware in a network.

FIG. 8 depicts an example method 800 for allocating hardware in a network. The operations depicted in example method 800 may be performed by a predictive edge compute system, an edge node, a boundary service, another computing device communicatively connected to a mobile computing device, and/or a combination thereof. At operation 802, historical request data for a plurality of requests is aggregated. The plurality of requests may be prior requests for computing services to be performed by one or mode edge nodes within the edge computing network. The aggregated historical request data may include a variety of types of request data discussed herein. For example, the aggregated historical request data may include, for a plurality of prior requests, a time of the request, a location of the device from which the request originated, and a type of service being requested, among other types of request data. The aggregated request data may also include a user identifier, a device identifier, latency data, jitter data, and/or packet loss. The aggregated request data may also include usage data such as CPU utilization, network interface utilization, requests per second, memory utilization, network alarms, component temperatures, and other similar usage data.

At operation 804, machine learning model is trained based on the aggregated historical request data. The machine learning model may be any type of ML/AI model discussed herein, and training of the machine learning model maybe performed using any of the techniques discussed herein, including the techniques described above with reference to method 600 depicted FIG. 6. At operation 806, a prediction for an amount or number of requests for services to be performed at the edge nodes may be generated from the machine learning model trained in operation 804. In addition to a prediction of the number or amount of requests, the trained machine learning model may also generate a prediction of the types of service that will be requested. Further, the machine learning model is trained on usage data, such as CPU utilization, to produce as output predicted usage data.

At operation 808, a predicted capacity needed to perform the predicted amount of requests is generated. The predicted capacity may be generated based on historical data regarding the amount of hardware resources that are required to perform the services requested. In some examples, predicting the capacity is also generated based on the predicted service types. For instance, based on historical performance data, a determination may be made as to how much storage, processing power, bandwidth, and other resources were required to perform different services (such as streaming services or AI processing) for a number of requests. That data may then be used to make a determination as to a predicted capacity for the predicted number of requests and the types of requests being made. In addition, where the trained machine learning model is trained on usage data, the output may be usage data which is also indicative of predicted capacity requirements and may be used to generate the predicted capacity requirements. For example, using CPU utilization as an example, the trained machine learning model may provide a predicted CPU utilization for a future time. Based on that predicted CPU utilization, a predicted capacity may be generated.

At operation 810, a comparison is made between the predicted capacity generated in operation 808 and a current capacity for one or more of the edge nodes. Based on the comparison, a recommendation for an alteration of hardware resources may be generated. For example, based on the comparison, a determination may be made that the predicted capacity exceeds the current capacity. When such a determination is made, method 800 flows to operation 812 where a recommendation to increase the hardware resources at one or more edge nodes is generated. The recommendation may be made to order additional hardware or transfer hardware from one edge node to another edge node. A hardware order to install the recommended hardware at the one or mode edge nodes may also be initiated or generated. In contrast, based on the comparison in operation 810, a determination may be made that the predicted capacity is less than the current capacity. When such a determination is made, method 800 flows to operation 814, where a recommendation to decrease the hardware resources at one or more edge nodes is generated. The recommendation may also be to transfer hardware resources from one edge node to another edge node. In examples where the machine learning model is trained on the usage data, such as CPU utilization, the output of the machine learning model may inherently include a comparison to current capacity. For example, if the trained machine learning model generates an output predicting that CPU utilization will be greater than 100% at a time in the future, a recommendation to increase the hardware resources may be generated because the predicted capacity is greater than the current capacity.

Accordingly, the present technology enhances network expansions and contractions based on data generated from the network itself. Planning for network expansions or contractions may be performed over different types of time series, including weeks, months, or years. Costs may also be calculated or otherwise determined. For example, cost per bit may be forecasted and inventory usage can be improved, monitored, and forecasted over time.

Figure 9:
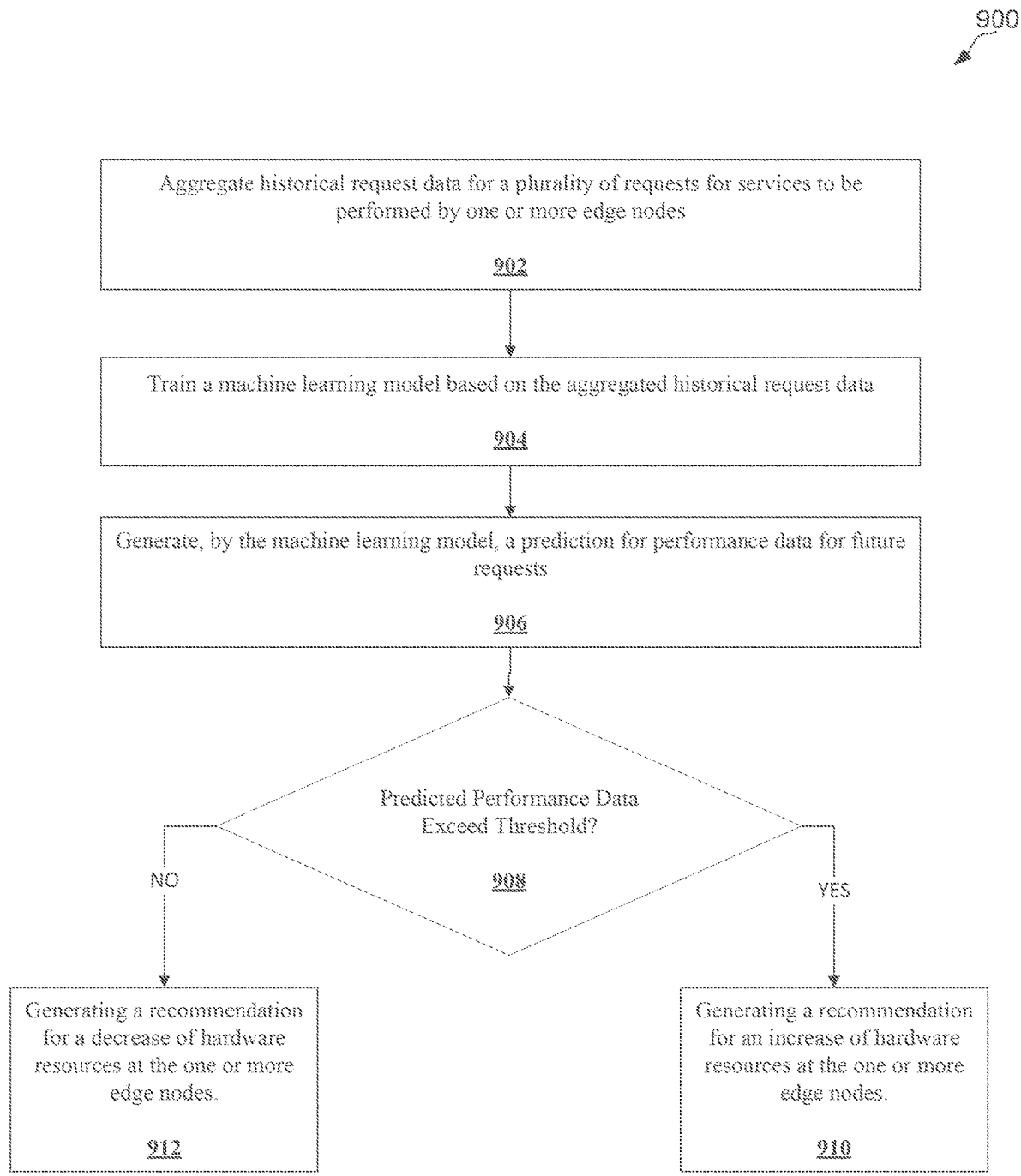
FIG. 9 depicts another example method for allocating hardware in a network.

FIG. 9 depicts another example method 900 for allocating hardware in a network. The operations depicted in example method 900 may be performed by a predictive edge compute system, an edge node, a boundary service, another computing device communicatively connected to a mobile computing device, and/or a combination thereof. At operation 902, historical request data is aggregated for a plurality of prior requests for computing services to be performed by one or more edge nodes. The historical request data may include performance or usage data for plurality of prior requests. For example, the historical request data may include data for jitter, latency, packet loss, CPU utilization, network interface utilization, requests per second, memory utilization, network alarms, component temperatures.

At operation 904, machine learning model is trained based on the aggregated historical request data. The machine learning model may be any type of ML/AI model discussed herein, and training of the machine learning model maybe performed using any of the techniques discussed herein, including the techniques described above with reference to method 600 depicted FIG. 6. The machine learning model is trained to produce an output indicative of predicted performance or usage data in the future. For example, a linear regression model may be applied against the aggregated historical request data to provide a prediction of future performance or usage data having data types corresponding to those data types in the aggregated historical request. At operation 906, a prediction for performance data for future requests is generated from the machine learning model. As examples, the predicted performance data may be for predicted future latency values or predicted future CPU utilization.

At operation 908, the predicted performance data generated in operation 906 is compared to a predetermined performance threshold to determine whether the predicted performance data exceeds the predetermined performance threshold. The predetermined performance threshold may be based on inherent features of the particular performance data being analyzed. For example, where the performance or usage data is CPU utilization or a similar value, the predetermined performance threshold may be 100%, which indicates that the one or more edge nodes will be at full capacity. In other examples, the predetermined threshold may otherwise be set, such as by a service level agreement. As an example, where the performance data is latency, a maximum latency value may be set in a service level agreement. That maximum latency value may be used as the predetermined performance threshold. Thus, in such an example, a determination is made in operation 908 as to whether the predicted latency value exceeds the maximum latency value being used as the predetermined performance threshold.

If the predicted performance data exceeds the predetermined performance threshold, the method 900 flows to operation 910 where a recommendation to increase the hardware resources at one or more edge nodes is generated. The recommendation may be made to order additional hardware or transfer hardware from one edge node to another edge node. A hardware order to install the recommended hardware at the one or mode edge nodes may also be initiated or generated. In contrast, if a determination may be made in operation 908 that the predicted performance data does not exceed the predetermined performance threshold, the method flows to operation 912 where a recommendation to decrease the hardware resources at one or more edge nodes is generated. The recommendation may also be to transfer hardware resources from one edge node to another edge node.

Figure 10:
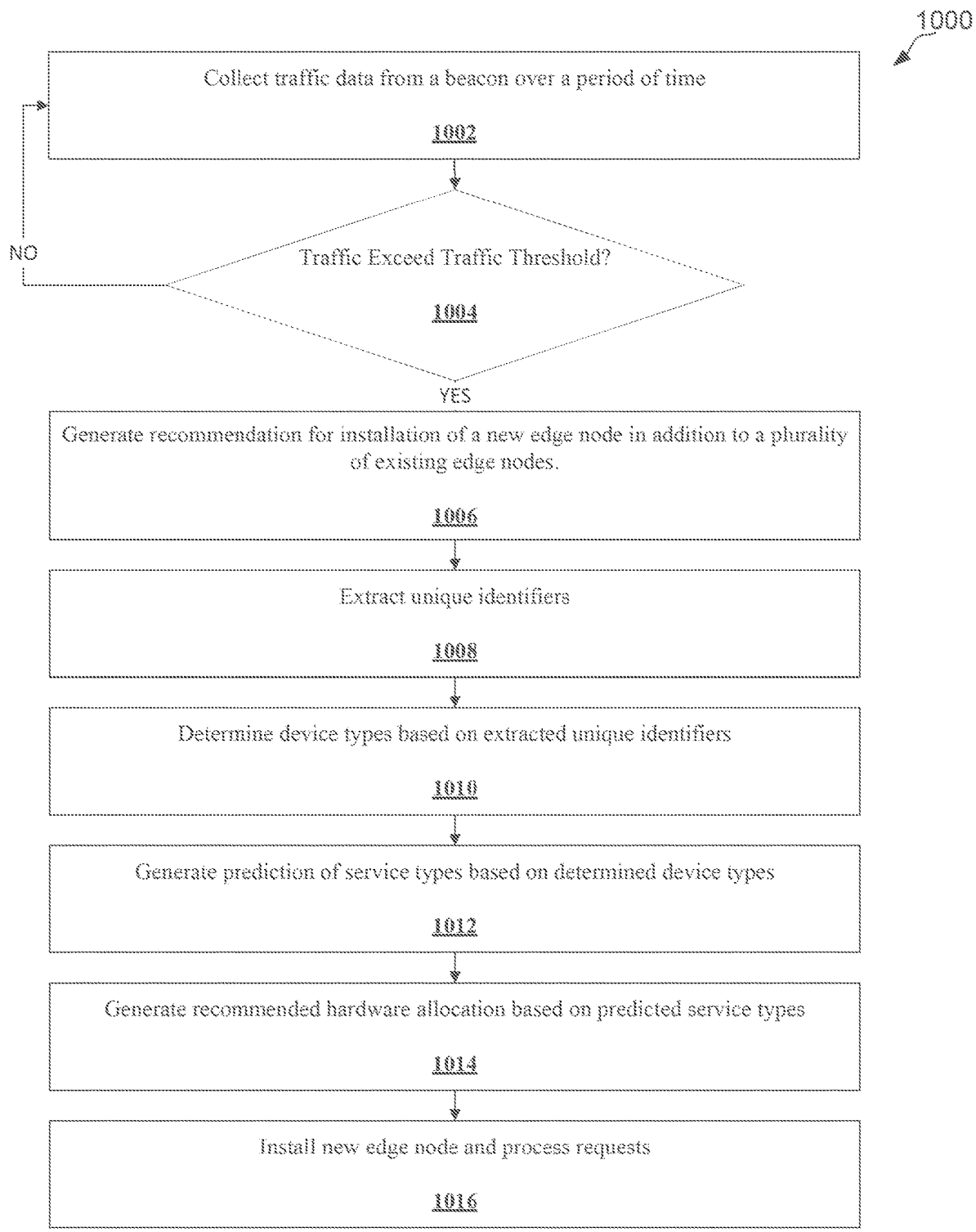
FIG. 10 depicts another example method for allocating hardware in a network.

FIG. 10 depicts another example method 1000 for allocating hardware in a network. The operations depicted in example method 1000 may be performed by a predictive edge compute system, an edge node, a boundary service, a beacon, another computing device communicatively connected to a mobile computing device, and/or a combination thereof. At operation 1002, traffic data may be collected over a period of time from a beacon. The beacon may any of the beacons discussed herein, such as one of the beacons 310 depicted in FIGS. 3A-3B. The beacon may monitor traffic in the form of the number of devices in a variety of techniques, includes those discussed herein. For example, the devices may be tracked by the beacon based on probe requests sent to the beacon from the each of the devices. Accordingly, the traffic data may include the amount or number of devices that sent probe requests to the beacon during the period of time.

At operation 1004 a comparison is made between the traffic data collected at operation 1002 and a predetermined traffic threshold. The predetermined traffic threshold may be set based on historical request data for other edge nodes. For example, the predetermined traffic threshold may be based on an average number of devices that other edge nodes receive requests from. An ML/AI model, such as a linear regression model, may also be trained based on the traffic data collected from the beacon. The trained machine learning model may then be used to predict an amount of traffic that will pass by the beacon in the future. That predicted traffic data may also or alternatively be compared to the predetermined traffic threshold in operation 1004.

If the traffic data collected from the beacon (or the predicted traffic data) is determined not to exceed the predetermined traffic threshold in operation 1004, method 1000 flows back to operation 1002 where traffic data continues to be collected. If the traffic data collected from the beacon (or the predicted traffic data) is determined to exceed the predetermined traffic threshold in operation 1004, method 1000 flows to operation 1006 where a recommendation for installation of a new edge node at the location of the beacon is generated. The recommendation for the new edge node is for a new edge node in addition to a plurality of edge nodes already in existence in the edge computing network.

Method 1000 may also provide recommendations for hardware allocations for the recommended new edge node. At operation 1008, unique identifiers are extracted for the devices identified in the traffic data. The unique identifiers may be extracted from the probe requests received by the beacon from the devices. For example, the unique identifiers may be MAC addresses for the devices. At operation 1010, device types are generated based on the extracted unique identifiers. For example, a device type for each device that sent a probe request may be determined from the corresponding MAC address.

At operation 1012, the likely types of service requests that would be received from the devices in the traffic data may be predicted based on the device types determined in operation 1010. For example, the request data gathered by the predictive edge compute system may also include the types of devices that are sending the requests along with the types of requests that are being sent from those devices. Accordingly, a determination may be made as to what types of devices most frequently request what types of services. Thus, by having the types of devices that are passing by the beacons, a prediction may be made as to the likely types of requests that would be generated by those devices.

At operation 1014, based on the predicted types of computing services determined in operation 1012, a recommended hardware allocation for the new edge node may be generated. For example, when the predicted computing services include web services, the recommended hardware allocation ma web servers. When the predicted computing services include streaming services, the recommended hardware allocation may include streaming servers. When the predicted computing services include AI services, the recommended hardware allocation may include specialized accelerators, such as GPU-based chips or cards, or similar devices suited for handling AI-related requests. Following operation 1014, method 1000 may flow to operation 1016 where the recommended new edge node is installed with the recommended hardware allocation. Operation 1016 may also include processing requests from computing devices and performing services with the hardware allocation.

Figure 11:
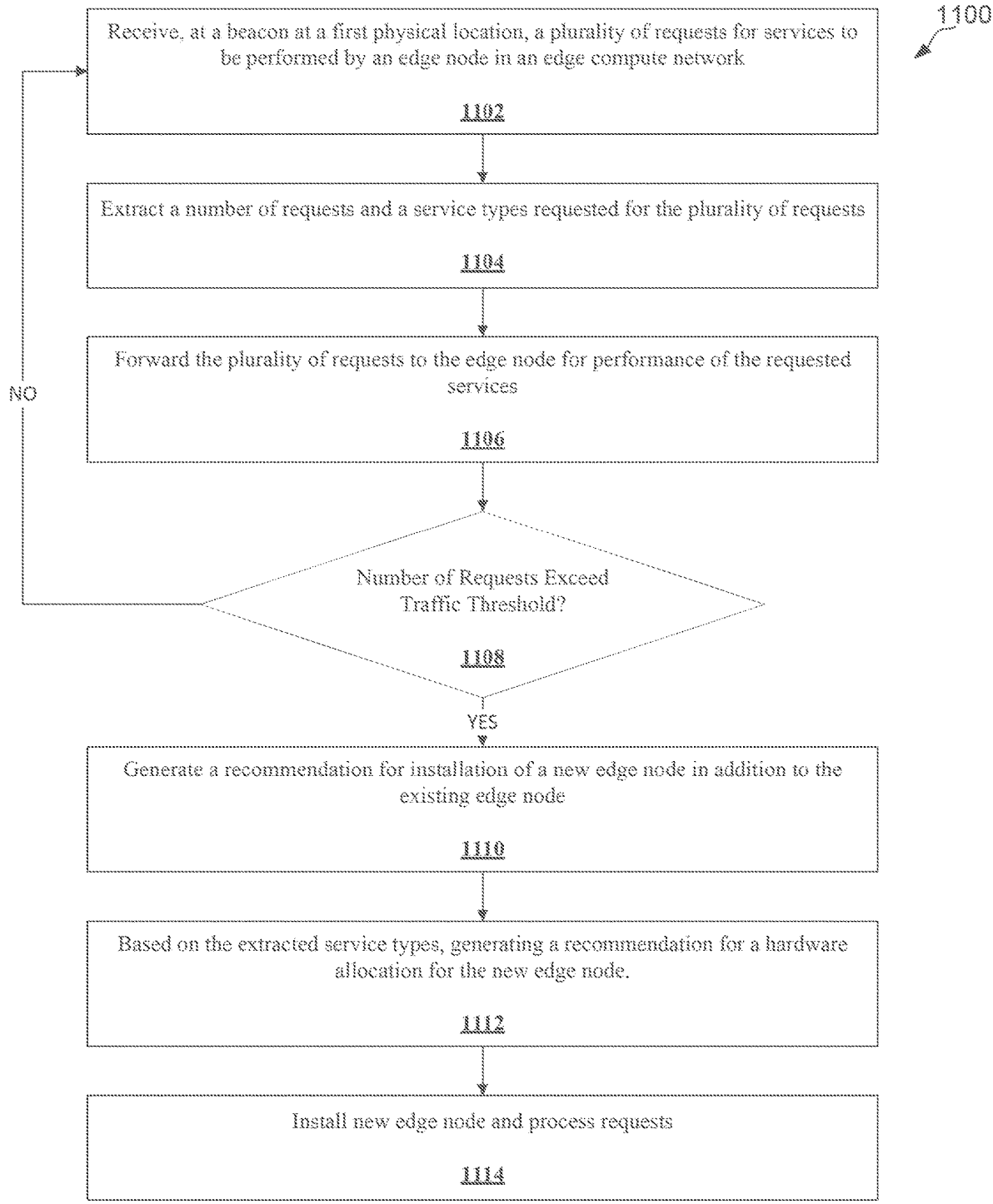
FIG. 11 depicts another example method for allocating hardware in a network.

FIG. 11 depicts another example method 1100 for allocating hardware in a network. The operations depicted in example method 1100 may be performed by a predictive edge compute system, an edge node, a boundary service, a beacon, another computing device communicatively connected to a mobile computing device, and/or a combination thereof. At operation 1102, a plurality of requests for computing services to be performed by an edge node in an edge compute network are received by a beacon. The beacon may be located in a specific physical location in a region. The beacon may any of the beacons discussed herein, such as one of the beacons 310 depicted in FIGS. 3A-3B.

At operation 1104, a number or amount of requests is extracted from the received plurality of requests. The type of services requested may also be extracted from the received plurality of requests in operation 1104. The requests are then forwarded to an edge node in the edge compute network for actual performance of the computing services in the request.

At operation 1108, a comparison is made between the number of requests extracted at operation 1104 and a predetermined traffic threshold. The predetermined traffic threshold may be set based on historical request data for other edge nodes. For example, the predetermined traffic threshold may be based on an average number of requests that other edge nodes receive. An ML/AI model, such as a linear regression model, may also be trained based on the extracted number of requests. The trained machine learning model may then be used to predict an amount of requests that will be received by the beacon in the future. That predicted number of requests may also or alternatively be compared to the predetermined traffic threshold in operation 1108.

If the extracted number of requests (or the predicted number of requests) is determined not to exceed the predetermined traffic threshold in operation 1108, method 1100 flows back to operation 1102 where requests continue to be received. If the extracted number of requests (or the predicted number of requests) is determined to exceed the predetermined traffic threshold in operation 1108, method 1100 flows to operation 1110, where a recommendation for installation of a new edge node at the location of the beacon is generated. The recommendation for the new edge node is for a new edge node in addition to the plurality of edge nodes already in existence in the edge computing network.

At operation 1112, based on service types extracted in operation 1104, a recommendation for a hardware allocation may be generated. For example, when the predicted computing services include web services, the recommended hardware allocation may include web servers. When the predicted computing services include streaming services, the recommended hardware allocation may include streaming servers. When the predicted computing services include AI services, the recommended hardware allocation may include specialized accelerators, such as GPU-based chips or cards, or similar devices suited for handling AI-related requests. Following operation 1112, method 1100 may flow to operation 1114 where the recommended new edge node is installed with the recommended hardware allocation. Operation 1114 may also include processing requests from computing devices and performing services with the hardware allocation.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Although specific embodiments are described herein, the scope of the technology is not limited to those specific embodiments. One skilled in the art will recognize other embodiments or improvements that are within the scope and spirit of the present technology. In addition, one having skill in the art will recognize that the various examples and embodiments described herein may be combined with one another. Therefore, the specific structure, acts, or media are disclosed only as illustrative embodiments. The scope of the technology is defined by the following claims and any equivalents therein.

What is claimed is:

1. A computer-implemented method for reducing latency in providing a computing service, the method comprising:
   aggregating historical request data for a plurality of requests;
   training a machine learning model based on the aggregated historical request data;
   assigning a unique identifier to one or more mobile computing devices to allow for tracking of the mobile computing device;
   generating, from the trained machine learning model, a prediction for a type of computing service to be requested at a predicted time and a predicted location based on at least geographic location data obtained by the tracking of the one or more mobile computing devices;
   based on the generated predicted location, identifying an edge node, from a plurality of edge nodes, based on a physical location of the edge node; and
   based on the generated predicted type of computing service and the predicted time, allocating computing resources for the computing service on the identified edge node.

2. The computer-implemented method of claim 1, wherein the machine learning model is at least one of a decision tree, a random forest, a neural network, a continual learning model, or a deep learning model.

3. The computer-implemented method of claim 1, wherein the unique identifier is one of a cookie or a media access control (MAC) address.

4. The computer-implemented method of claim 1, wherein allocating the computing resources comprises performing at least one of:
   deploying a virtualized software;
   deploying a virtualized instance;
   deploying a virtualized machine;
   deploying virtualized infrastructure;
   deploying a virtualized container;
   loading a database into memory of the identified edge node;
   caching content for the computing service; or
   allocating storage resources in memory of the identified edge node.

5. The computer-implemented method of claim 1, wherein identified edge node includes at least one of a server, a graphics processing unit (GPU), a central processing unit (CPU), or a field-programmable gate array (FPGA).

6. The computer-implemented method of claim 1, further comprising:
   receiving, from a computing device, a request for the predicted service type at the predicted time; and
   performing, by the identified edge node, the requested service with the allocated computing resources.

7. The computer-implemented method of claim 6, wherein the computing device is one of a smart phone, laptop, vehicle, drone, a mobile computer, or a plane.

8. A system for reducing latency in providing a computing service, the system comprising:
- a plurality of edge nodes having different physical locations;
- at least one processor; and
- memory, operatively connected to the at least one processor and storing instructions that, when executed by the at least one processor, cause the at least one processor to perform a set of operations comprising:
- training a machine learning model based on historical request data for a plurality of requests;
- assigning a unique identifier to one or more mobile computing devices to allow for tracking of the mobile computing device;
- generating, from the trained machine learning model, a prediction for a type of computing service to be requested at a predicted time and a predicted location based on at least geographic location data obtained by the tracking of the one or more mobile computing devices;
- based on the generated predicted location, identifying an edge node, from a plurality of edge nodes, based on a physical location of the edge node; and
- based on the generated predicted type of computing service and the predicted time, allocating computing resources for the computing service on the identified edge node prior to the predicted time.

9. The system of claim 8, wherein the historical request data includes at least the following data for a plurality of requests: a time of the request, a location of the device from where the request originated, and a type of service being requested.

10. The system of claim 8, wherein the machine learning model is at least one of a decision tree, a random forest, a neural network, a continual learning model, or a deep learning model.

11. The system of claim 8, wherein allocating the computing resources comprises performing at least one of:
- deploying a virtualized software;
- deploying a virtualized instance;
- deploying a virtualized machine;
- deploying virtualized infrastructure;
- deploying a virtualized container;
- loading a database into memory of the identified edge node;
- caching content for the computing service; or
- allocating storage resources in memory of the identified edge node.

12. The system of claim 8, wherein identified edge node includes at least one of a server, a graphics processing unit (GPU), a central processing unit (CPU), or a field-programmable gate array (FPGA).

13. The system of claim 8, wherein the operation further comprise:
- receiving, from one of the one or more mobile computing devices, a request for the predicted service type at the predicted time; and
- performing, by the identified edge node, the requested service with the allocated computing resources.

14. The system of claim 13 wherein the one mobile computing device is one of a smart phone, laptop, vehicle, drone, a mobile computer, or a plane.

* * * * *